(12) United States Patent
Avrahami et al.

(10) Patent No.: US 12,347,090 B2
(45) Date of Patent: Jul. 1, 2025

(54) AUTOMATED INSPECTION AND PART ENROLLMENT

(71) Applicant: Kitov Systems Ltd., Rosh Haayin (IL)

(72) Inventors: Nir Avrahami, Herzliya (IL); Joseph Rubner, Shoham (IL); Kfir Gedalyahu, Ganei Tikva (IL); Eran Vered, Ramat Gan (IL); Liran Tzafri, Rishon LeTsiyon (IL)

(73) Assignee: Kitov Systems Ltd, Petach Tikva (IL)

( * ) Notice: Subject to any disclaimer, the term of this patent is extended or adjusted under 35 U.S.C. 154(b) by 1041 days.

(21) Appl. No.: 16/962,496

(22) PCT Filed: Jan. 15, 2019

(86) PCT No.: PCT/US2019/013720
§ 371 (c)(1),
(2) Date: Jul. 15, 2020

(87) PCT Pub. No.: WO2019/156783
PCT Pub. Date: Aug. 15, 2019

(65) Prior Publication Data
US 2021/0082105 A1 Mar. 18, 2021

Related U.S. Application Data

(60) Provisional application No. 62/617,312, filed on Jan. 15, 2018.

(51) Int. Cl.
*G06T 7/00* (2017.01)
*G06T 1/20* (2006.01)
*G06T 1/60* (2006.01)

(52) U.S. Cl.
CPC .............. *G06T 7/0004* (2013.01); *G06T 1/20* (2013.01); *G06T 1/60* (2013.01);
(Continued)

(58) Field of Classification Search
CPC ........... G06T 7/0004; G06T 1/20; G06T 1/60; G06T 2207/30108; G05B 2219/37443;
(Continued)

(56) References Cited

U.S. PATENT DOCUMENTS

2005/0171733 A1* 8/2005 Hough .................... G01B 21/04
702/182
2006/0212171 A1* 9/2006 Ban ........................ B25J 9/1697
700/245

(Continued)

FOREIGN PATENT DOCUMENTS

CN 107408297 11/2017
JP H08-304581 11/1996
(Continued)

OTHER PUBLICATIONS

Notice of Reason(s) for Rejection Dated Jan. 2, 31023From the Japan Patent Office Re. Application No. 2020-540285 and Its Translation Into English. (12 Pages).
(Continued)

*Primary Examiner* — Santosh R Poudel

(57) ABSTRACT

Systems and methods are disclosed for automated inspection and part enrollment. In one implementation, a selection of an area of a part is received within a graphical user interface depicting a representation of the part. Based on the selection of the area of the part, a location of the selected area is determined. Image capture parameter(s) are determined based on the determined location. Based on (a) the determined image capture parameters and (b) the location of the selected area, an inspection path is computed with respect to the part. The computed inspection path is executed with respect to the part via an inspection system.

30 Claims, 24 Drawing Sheets

(52) U.S. Cl.
CPC .............. *G05B 2219/37443* (2013.01); *G05B 2219/37452* (2013.01); *G06T 2207/30108* (2013.01)

(58) Field of Classification Search
CPC ........... G05B 2219/37452; G05B 2219/35216; G05B 2219/37205; G05B 2219/37439; G05B 19/4097; G05B 19/401
See application file for complete search history.

(56) References Cited

U.S. PATENT DOCUMENTS

| | | | | |
|---|---|---|---|---|
| 2006/0224348 | A1* | 10/2006 | Shankarappa | G01N 27/9013 702/123 |
| 2007/0052803 | A1* | 3/2007 | Chosak | G08B 13/1968 348/E7.086 |
| 2007/0122026 | A1* | 5/2007 | Ersue | G01N 21/9515 382/141 |
| 2010/0063617 | A1* | 3/2010 | Mori | B23Q 17/20 700/175 |
| 2013/0203320 | A1* | 8/2013 | Ghalambor | B24C 1/083 451/2 |
| 2013/0278725 | A1 | 10/2013 | Mannan et al. | |
| 2014/0293047 | A1* | 10/2014 | Morris | E02F 9/2054 348/143 |
| 2015/0003678 | A1* | 1/2015 | Watanabe | B25J 9/1697 382/103 |
| 2015/0012171 | A1 | 1/2015 | Richter et al. | |
| 2015/0169790 | A1* | 6/2015 | Tseo | G05B 19/41875 700/98 |
| 2016/0033251 | A1 | 2/2016 | Pinkston | |
| 2016/0318632 | A1 | 11/2016 | Froom et al. | |
| 2017/0089694 | A1* | 3/2017 | Groninger | G01N 29/0645 |
| 2017/0090742 | A1* | 3/2017 | Ade | G01B 21/047 |
| 2017/0236270 | A1* | 8/2017 | Hanna | F42B 35/00 348/92 |
| 2018/0231474 | A1* | 8/2018 | Yoshida | G01N 21/9515 |
| 2019/0096055 | A1* | 3/2019 | Namiki | B25J 19/023 |

FOREIGN PATENT DOCUMENTS

| | | |
|---|---|---|
| JP | H09-304286 | 11/1997 |
| JP | H10-74262 | 3/1998 |
| JP | 2002-008013 | 1/2002 |
| JP | 2017-194334 | 10/2017 |
| WO | WO 2016/018717 | 2/2016 |
| WO | WO 2016/083897 | 6/2016 |
| WO | WO 2016/179186 | 11/2016 |

OTHER PUBLICATIONS

Supplementary European Search Report and the European Search Opinion Dated Sep. 28, 2021 From the European Patent Office Re. Application No. 19751933.3. (9 Pages).
Communication Pursuant to Article 94(3) EPC Dated Jun. 16, 2023 From the European Patent Office Re. Application No. 19751933.3 (4 Pages).
Translation Dated Apr. 4, 2023 of Notification of Office Action and Search Report Dated Mar. 2, 2023 From the State Intellectual Property Office of the People's Republic of China Re. Application No. 201980019230.3 (14 pages).
Notification of Office Action Dated Mar. 2, 2023 From the State Intellectual Property Office of the People's Republic of China Re. Application No. 201980019230.3. (9 Pages).
International Preliminary Report on Patentability Dated Mar. 10, 2020 From the International Preliminary Examining Authority Re. Application No. PCT/IB2019/013720. (37 Pages).
International Search Report and the Written Opinion Dated Jul. 25, 2019 From the International Searching Authority Re. Application No. PCT/IL2019/013720. (8 Pages).
Translation Dated Dec. 4, 2023 of Notification of Office Action Dated Nov. 8, 2023 From the State Intellectual Property Office of the People's Republic of China Re. Application No. 201980019230. 3. (4 Pages).
Notification of Office Action Dated Nov. 8, 2023 From the State Intellectual Property Office of the People's Republic of China Re. Application No. 201980019230.3. (3 Pages).
Notice of Reason(s) for Rejection Dated Aug. 8, 2023 From the Japan Patent Office Re. Application No. 2020-540285 and Its Translation Into English. (5 Pages).
Notification of Office Action Dated Apr. 10, 2024 From the National Intellectual Property Administration of the People's Republic of China Re. Application No. 201980019230.3 and Its Translation Into English. (14 Pages).
Notice of Reasons for Rejection Dated Sep. 3, 2024 From the Japan Patent Office Re. Application No. 2020-540285 and Its Translation Into English. (21 Pages).
Notice of Reason(s) for Rejection Dated Dec. 24, 2024 From the Japan Patent Office Re. Application No. 2023-207156 and Its Translation Into English. (20 Pages).

\* cited by examiner

AUTOMATED INSPECTION AND PART ENROLLMENT

CROSS-REFERENCE TO RELATED APPLICATIONS

This application is related to and claims the benefit of priority to U.S. Patent Application No. 62/617,312, filed Jan. 15, 2018, which is incorporated herein by reference in its entirety.

TECHNICAL FIELD

Aspects and implementations of the present disclosure relate to data processing and, more specifically, but without limitation, to automated inspection and part enrollment.

BACKGROUND

In many industries, such as those involving manufactured products, it can be advantageous to inspect such products to ensure they are free of defects. Such inspections are frequently conducted manually (e.g., by human inspectors) which can result in various inaccuracies and inefficiencies.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
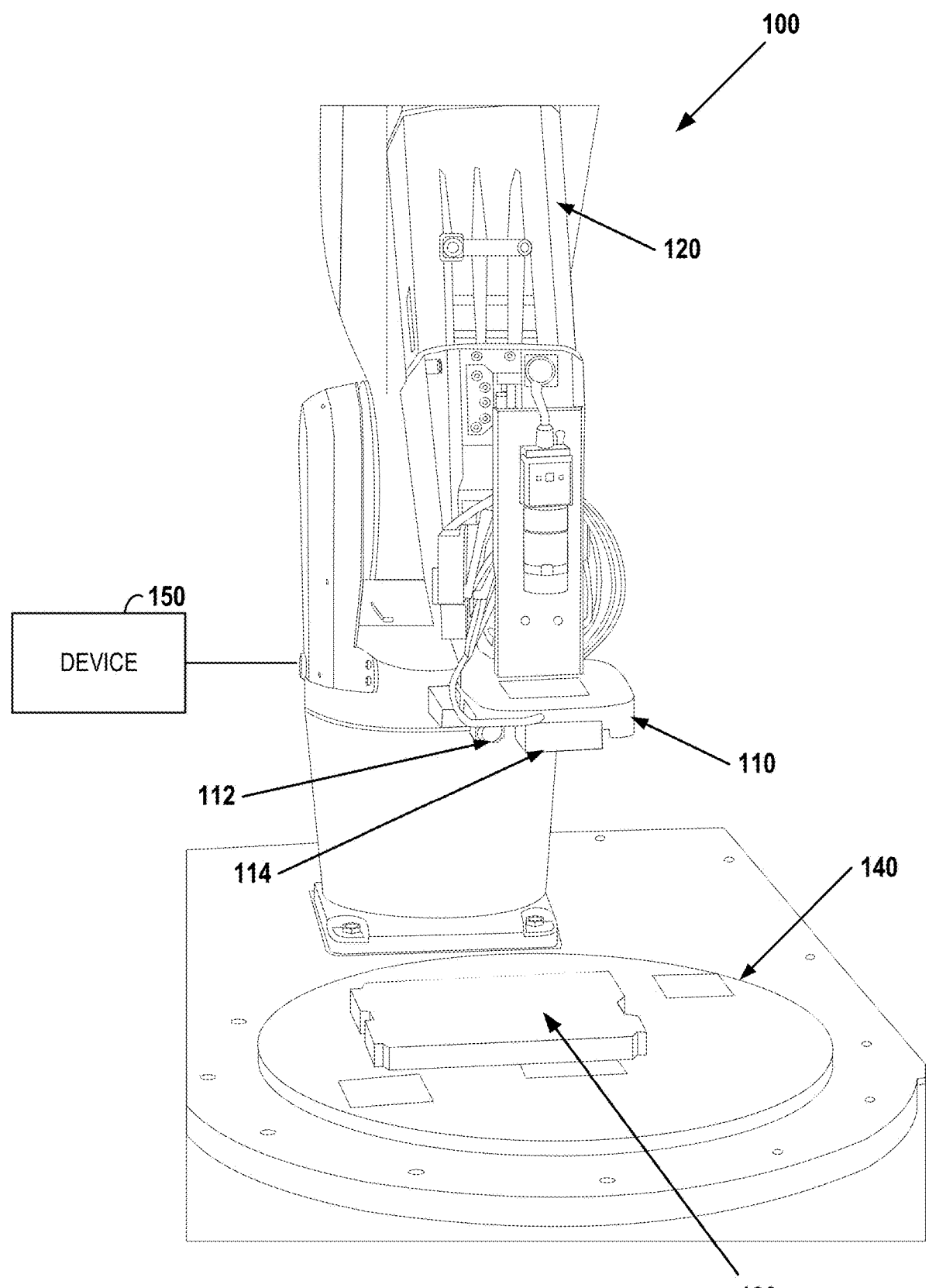
FIG. 1 illustrates an example system, in accordance with an example embodiment.

Aspects and implementations of the present disclosure are directed to automated inspection and part enrollment.

The described technologies can be employed with respect to manufactured or assembled products/objects, manufacturing processes, etc. In many scenarios product inspections are performed manually (e.g., by human inspectors). Such manual inspections entail numerous inefficiencies such as incorrect or imprecise results (e.g., due to human error).

Certain technologies do attempt to automate certain aspects of visual inspection, however numerous inefficiencies remain. For example, existing inspection technologies are often complex. Such systems often must be configured by highly trained/skilled users in order to operate properly. Thus, such systems (which must be configured by skilled/trained personnel in order to operate properly) may not be cost effectively utilized for low-cost and/or low-margin parts.

Accordingly, described herein in various implementations are systems, methods, techniques, and related technologies directed to automated inspection (e.g., part/product inspection). Among the referenced technologies is an inspection station or system configured for the inspection (e.g., surface inspection) of parts, objects, products, etc., such as those with complex three-dimensional structures.

As described herein, in certain implementations the referenced inspection station/system can incorporate hardware elements including but not limited to: illumination device(s), sensor(s), articulating arm(s) and/or any other such mechanical or robotic element(s). By incorporating such technologies, a single universal inspection system can be deployed in practically any context/setting (e.g., for the inspection of practically any/all types of parts). Accordingly, the described technologies can provide significant advantages and/or improvements over existing technologies, e.g., in scenarios in which aspects of the products/objects to be inspected change regularly (thus making dedicated inspection systems impractical).

Additionally, in certain implementations the described technologies can be configured in an intuitive and straightforward manner (e.g., even by a user without specialized technical training) As described in detail herein, the described technologies can enable a highly efficient inspection process which can be configured, calibrated, etc. with respect to practically any part in a relatively short time. In doing so, a single inspection system/station can be utilized to inspect multiple parts/products. Additionally, such a system can transition from inspecting one product to another with little or no 'downtime' in between inspections. In doing so, the described technologies can be effectively and efficiently implemented in scenarios and settings with respect to which automated inspection might otherwise be inefficient or cost prohibitive.

Additionally, in certain implementations the described technologies enable and/or facilitate the defining of various test parameters, requirements, etc., e.g., in relation to a model of a part to be inspected. The described technologies can further automatically convert the referenced parameters, requirements, etc., into a full inspection plan. Such an inspection plan can include motion, acquisition and/or the test definitions, which can specify operations, processes, tests, etc. that need to be run (e.g., on various computed/identified regions, areas, etc., e.g., within the described generated images, as well as the parameters these operations, processes, tests, etc. should use for the tests.

It can therefore be appreciated that the described technologies are directed to and address specific technical challenges and longstanding deficiencies in multiple technical areas, including but not limited to manufacturing, product inspection, and automation. As described in detail herein, the disclosed technologies provide specific, technical solutions to the referenced technical challenges and unmet needs in the referenced technical fields and provide numerous advantages and improvements upon conventional approaches.

Additionally, in various implementations one or more of the hardware elements, components, etc., referenced herein operate to enable, improve, and/or enhance the described technologies, such as in a manner described herein.

An example inspection device 100 is shown in FIG. 1. As shown, the inspection device 100 can include an optical head 110. The optical head can include or incorporate illumination devices 112 (e.g., incandescent, infrared, laser, etc.) and/or sensors 114 (e.g. 1D/2D/3D cameras, etc.). Such sensors 114 can operate in conjunction with the referenced illumination devices 112 (which may be of different relative position, spectrum, type, etc.).

Additionally, optical head 110 can be maneuvered in space relative to the object/part 130 under inspection. For example, in certain implementations, optical head 110 can be mounted on a moveable arm/robot 120 that changes the position of optical head 110, e.g., during inspection.

In certain implementations, an additional/discrete computing device (e.g., one or more processors, such as those depicted in FIG. 12 and described herein) can be installed or otherwise integrated at/within the optical head. Such a computing device can be configured, in certain implementations, to analyze raw data (e.g., as captured by the referenced sensor(s) 112). In doing so, significant efficiencies can be realized by reducing the amount of data (e.g., images, etc.) to be transmitted (e.g., to another system, device, etc., for additional processing). For example, doing so can enable only the parts/regions where a defect is suspected (or which otherwise require more complex processing) to be identified/transmitted for more thorough analysis (e.g., on a dedicated station/server).

In certain implementations, the described system can further include or incorporate device 150. Such a device can be a computing device, terminal, etc., such as those described herein (e.g., in relation to FIG. 12). Such a device 150 can be configured to visually present various information to a user (e.g., visual depictions of various models, images captured, menus of options that can be selected, etc.). in certain implementations, device 150 can also include various input/output interfaces (e.g., touchscreen, keyboard, mouse, etc.), as described herein. Such interfaces can enable a user/operator to provide input, selections, etc., in order to configure, control, and/or adjust operation of the system 100, as described herein. Device 150 and/or other component(s) of system 100 can also include applications, programs, instructions, etc., such as a part enrollment/inspection application that configures the various described components to perform one or more of the operations described herein.

The object(s)/part(s) 130 being inspected by the described inspection system may be positioned or oriented in any number of ways. For example, the part may be fixed (that is, inspected by optical head 110 without otherwise changing or altering the position of the object). In other implementations, the orientation of the part can be changed/adjusted, such as by utilizing a moving, rotating, etc. platform and/or a robotic arm to grip/secure the part and to change its orientation (e.g., in relation to the optical head or optical capture device). In yet other implementations, the part may be positioned on a moving conveyer belt (and the inspection system may, for example, inspect the part, or various aspects thereof, while it remains in motion). By way of illustration, FIG. 1 depicts part 130 situated on a platform or fixture 140. In certain implementations, platform 140 can be configured to rotate in any number of directions, angles, etc., such as in order to change the positioning of part 130 (e.g., while the part is undergoing inspection).

As described herein, in certain implementations various aspects of the referenced part/object can be analyzed to ensure that accurate measurements are achieved for various aspects of the object. Additionally, the referenced analysis can include generating a definition of various structural boundaries of the object. Defining such structural boundaries can be advantageous, for example in order to prevent or avoid damage to the inspection system or the part (such as may occur in the case of a collision between a maneuverable optical head and the part). Images may be captured from different directions relative to any number of points on the product and/or under different conditions (such as with different types/levels of illumination and/or from different directions).

In certain implementations, it may be advantageous to perform qualitatively and quantitatively different types of inspection with respect to different areas, regions, aspects, elements, etc. of a part. For example, it may be advantageous to subject areas, regions, aspects, elements, etc. of a part to one type of inspection (at a particular level of inspection) while subjecting other areas, regions, etc. of the same part to different type(s) or level(s) of inspection. The type of inspection that a particular area, region, etc. is associated with can be a function of any number of factors (e.g., size, shape, structure, material composition, etc.). For example, with respect to a part that incorporates a glossy surface and several screws, it may be advantageous to inspect the glossy surface using one set of inspection techniques (e.g., using various degrees of illumination to determine if scratches are present) while inspecting the screw(s) using a different set of inspection techniques (e.g., inspecting such area(s) from different angles to determine whether the screw is present, is screwed in completely or only partially, etc.).

The particular parameters/inspection techniques to be applied to a particular area, region, etc., of a part can be received from/determined based on a knowledge base (which can be, for example, a database or storage service included within and/or accessible to device 150) that reflects various quality scores for different sets of parameters as applied to a particular inspection context. Accordingly, those parameters/techniques that can be determined to provide high quality/optimal results for a specific inspection context/scenario (e.g., the inspection of a screw, a connector, a reflective surface, a certain material type, etc.) can be selected and incorporated into an inspection plan for the referenced part to be inspected, while those inspection parameters/techniques determined to provide sub-optimal results (e.g., as reflected in the referenced 'knowledge base') may not be incorporated into the inspection plan.

In certain implementations such areas, regions, etc. of a part may be identified or selected manually. For example, a user/administrator can be presented with a model (or another representation) of a reference part. Such a user can select or identify (e.g., using a graphical user interface) respective areas, regions, etc. of the part (e.g., the presence of a screw in one area, a glossy surface in another area, a connector in another area, etc.). In certain implementations, upon identifying/selecting such areas, regions, etc., the user can further dictate or define various aspects of the inspection parameters that are to be applied to the particular region (e.g., to utilize various levels of illumination, to inspect from multiple angles, to determine the presence of scratches, etc.).

In other implementations, the referenced knowledge base can be utilized to dictate the parameters to be applied to a particular region. For example, upon selecting a particular area or region of a part as containing a screw, the knowledge base can be queried to identify/determine inspection parameters to be applied to such a region (e.g., inspection parameters that are likely to enable the determination that such a screw is present and/or fully tightened, such as by capturing images of the region at different angles under different degrees of illumination). In doing so, the described technologies can enable an inspection system to quickly enroll new parts to be inspected, and to generate inspection plan(s) for such parts that enable the efficient and effective inspection of the parts (e.g., by inspecting respective areas, regions, aspects, elements, etc. of a part using different inspection parameters that reflect the specifications of that particular part). Additionally, in doing so the described technologies can enable a user who may not possess much (if any) experience or training in preparing inspection plans to accurately and efficiently define an inspection plan for a part that can be executed in an efficient and effective manner. As described, the user can simply select or otherwise indicate various areas, regions, etc. of the part, and the described technologies can determine the inspection parameters to be associated with each respective area, etc. (e.g., utilizing the referenced knowledge base).

In yet other implementations, the referenced areas, regions, etc. of a part may be identified or selected in an automatic or automated fashion. For example, reference part(s) and/or other types or forms of representation of the part (e.g., CAD models, etc.) can be received and/or provided. Such referenced part(s) can be analyzed or otherwise processed (e.g., based on inputs received from various types of sensors) to identify/determine the presence of respective areas, regions, etc. within the reference part (e.g., the presence of a screw in one area, a glossy surface in another area, a connector in another area, etc.). In certain implementations, the referenced knowledge base can then be utilized to determine the inspection parameters to be applied to each identified area, region, etc. For example, upon determining that a particular area or region of a part contains a screw, such a region can be associated with a particular set of inspection parameters (e.g., parameters likely to enable the determination that such a screw is present and/or fully tightened, such as by capturing images of the region at different angles under different degrees of illumination). In other implementations, upon identifying such areas, regions, aspects, elements, etc., a user may be enabled to manually dictate or define various aspects of the inspection parameters that are to be applied to the particular region, as described herein. In doing so, the described technologies can enable an inspection system to enroll new parts to be inspected, and to generate efficient and effective inspection plan(s) for such parts in an automated fashion.

As described herein, in certain implementations the described technologies can initially perform an enrollment process with respect to a part to be inspected. During such enrollment process, the part can be introduced into the inspection system. The system analyzes or 'learns' the part and produces a multidimensional model (MDM) containing a rough/fine description of features, aspects, etc. of the part (e.g., part geometry, visual characteristics, etc.).

As noted above and depicted in FIG. 1, in certain implementations the part to be inspected can be on a mounted fixture or platform (e.g., platform 140). When a fixture is present, it can be advantageous for the dimensions (and other aspects) of the platform to be analyzed or 'learned' by the disclosed inspection system.

The referenced fixture can be a support device or platform mounted onto/in relation to the described inspection system. In certain implementations, the fixture can be configured to secure a part onto it during the inspection process (e.g. in case of a turntable). By 'learning' features of the fixture, the inspection system can further account for its position, e.g., to avoid colliding with it during inspection.

The 3D structure of the fixture can be determined in various ways. For example, using a CAD model of the fixture, a predefined bounding 3D shape of the fixture, and/or a remote sensor (e.g. 3D camera), the dimensions, position, etc. of the fixture can be identified/determined.

Figure 2:
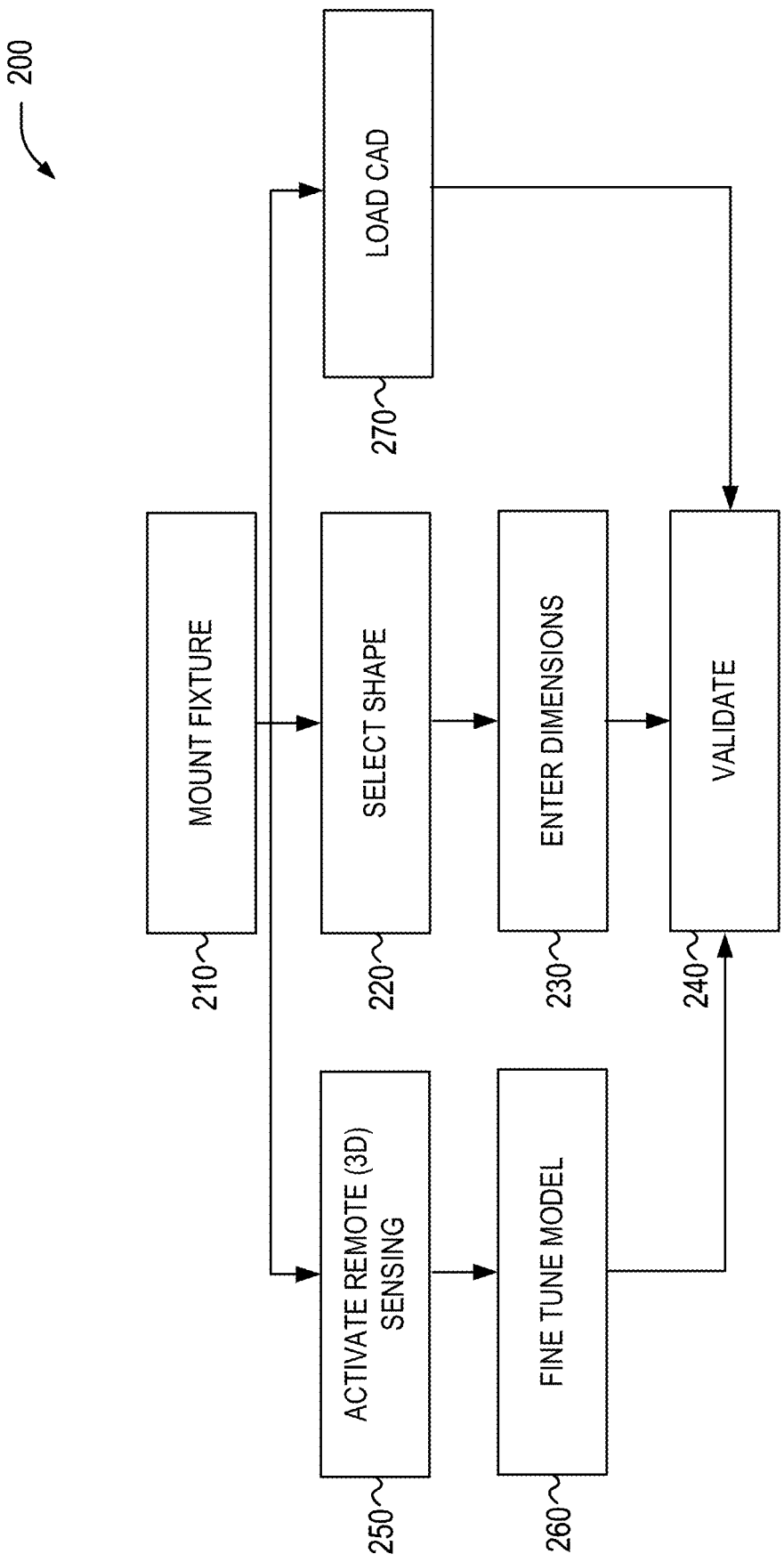
FIG. 2 is a flow chart illustrating aspects of a method for automated inspection and part enrollment, in accordance with an example embodiment.

FIG. 2 is a flow chart illustrating a method 200, according to an example embodiment, for identifying/analyzing a fixture. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to system 100, device 150, an application executing at system 100 and/or device 150, etc.) while in some other implementations, the one or more blocks of FIG. 2 can be performed by another machine or machines.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In certain implementations, a model (e.g., a CAD model) reflecting a representation of a fixture (e.g., a fixture configured to support the part within the described inspection system) can be identified. One or more dimensions of the fixture can be computed based on the model. Alternatively, one or more inputs corresponding to one or more dimension(s), shape(s), template(s) (e.g., that reflect dimension(s) of the fixture etc.) of the fixture can be received. One or more images of the fixture can be captured and associated with the computed dimensions of the fixture. In certain implementations, one or more of the captured image(s) can be presented, via a graphical user interface, in relation to a representation of the dimension(s) of the fixture (e.g., as an overlay, as described herein. The computed dimensions of the fixture can be validated based on the association of the one or more captured images. For example, input(s) corresponding to the association of the captured image(s) with the computed dimension(s) of the fixture can be received. In certain implementations, such inputs can reflect that the computed dimension(s) are/are not accurate with respect to the fixture as depicted in the one or more images. Additionally, in certain implementations the computed dimension(s) can be adjusted based on the received input(s).

By way of further illustration, as shown in FIG. 2, the referenced fixture can be mounted or otherwise introduced to an inspection system (210). Following the introduction of the fixture, the inspection system (e.g., the optical head, robotic arm, etc.) can be configured to move to acquire images at various positions. Such image(s) can then be processed (e.g., by comparing them to other data such as a CAD model) to verify that the mounted fixture matches the loaded fixture details.

Figure 3A:
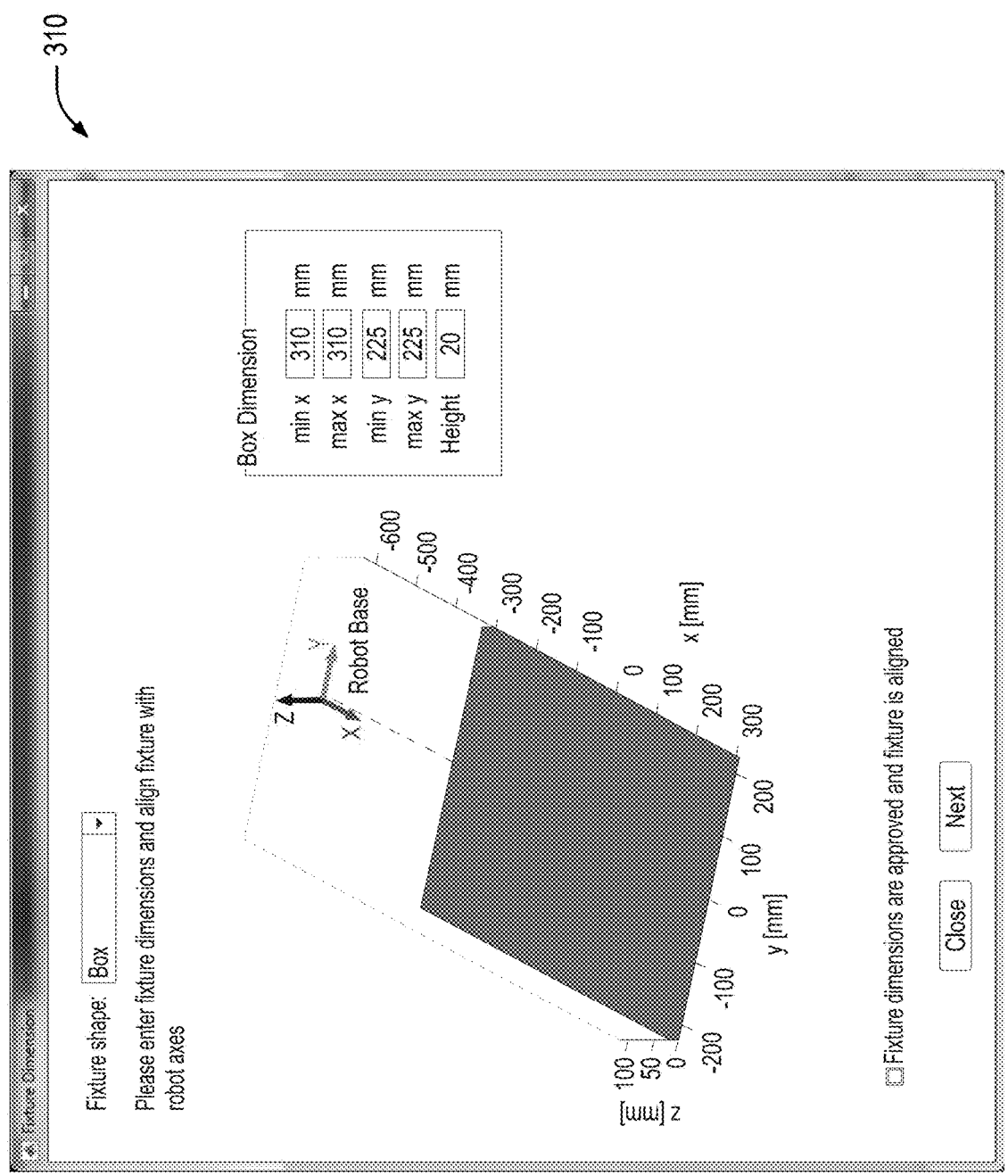
FIGS. 3A-3C illustrate example scenarios described herein, according to example embodiments.

Such a validation process can be performed manually or automatically. Manual validation can be performed, for example, by enabling a user to input or define various aspects of the fixture, such as by selecting a shape of the fixture (220), dimensions of the fixture (230), etc. For example, FIG. 3A depicts an example graphical user interface (GUI) 310 in which a user can select a shape of the referenced fixture and define dimensions of the fixture.

Figure 3B:
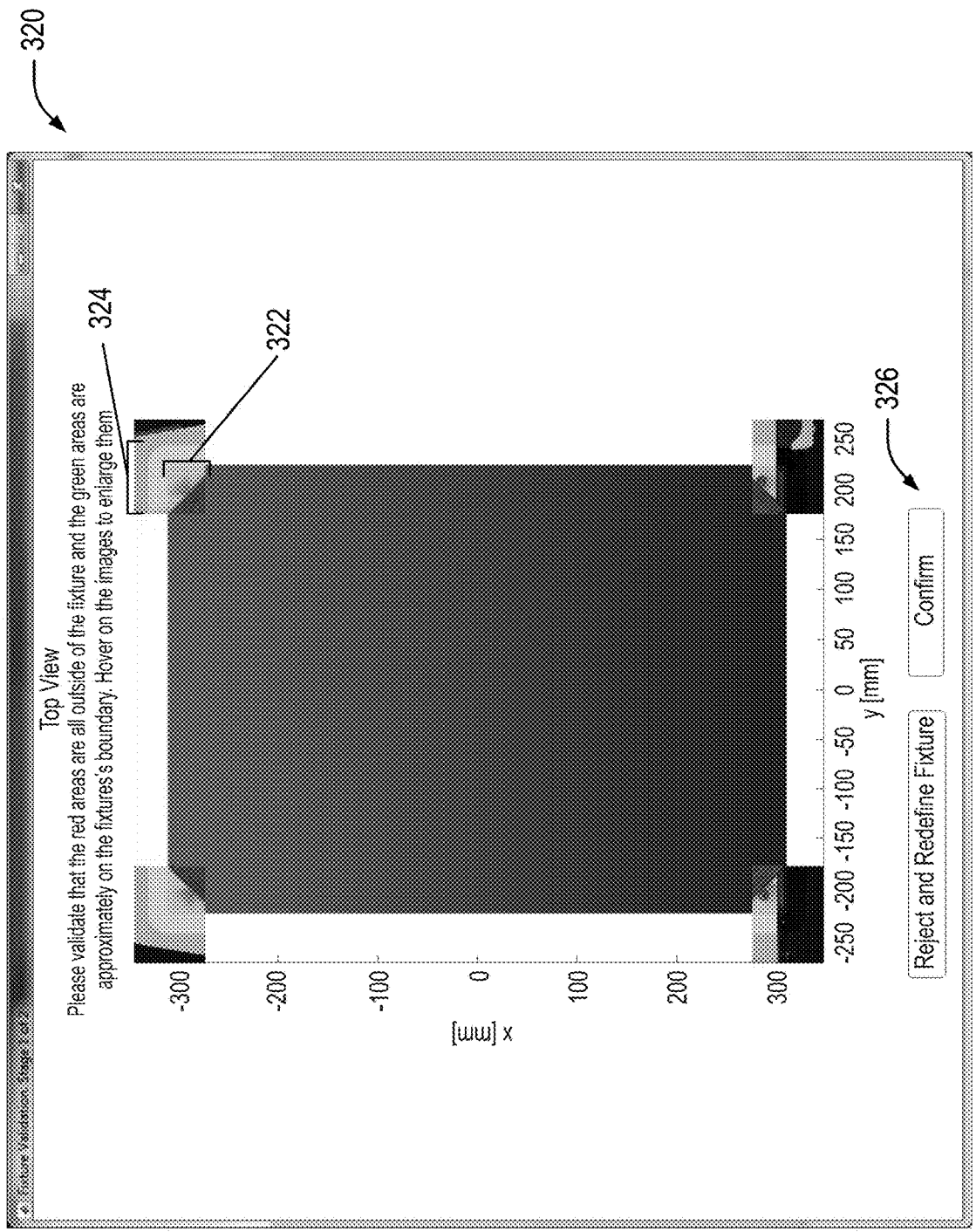
Figure 3C:
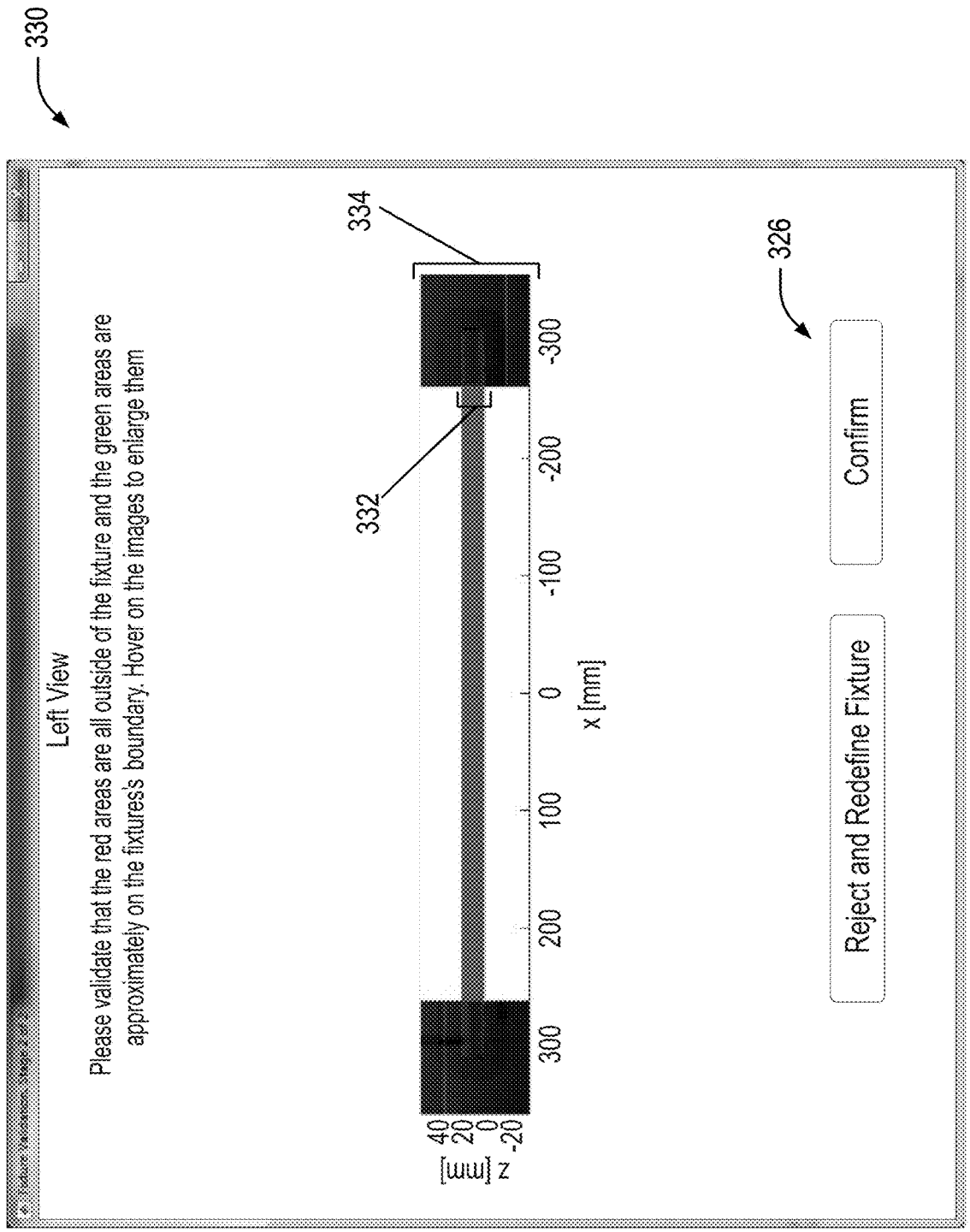

In certain implementations, image(s) of the referenced fixture can be captured (e.g., by optical head 110). Such images can then be displayed, e.g., as an overlay on top of the model of the fixture (e.g., a model as defined or selected by the user as shown in FIG. 3A, or a CAD model). FIGS. 3B and 3C depict example GUIs (320 and 330, respectively) that depict a model of the referenced fixture overlaid with image(s) captured by optical head 110 of the fixture as installed within system 100. As shown in FIGS. 3B and 3C, in certain implementations, the images can be associated or augmented with visual indicators or 'masks' (e.g., green and/or red masks). One such mask (e.g., a green mask) can depict the approximate location of the fixture. For example, as shown in FIG. 3B (which reflects an overhead view of the referenced fixture), mask 322 can reflect area(s) or region(s) that correspond to the location or position of the fixture. Another such mask 324 (e.g., a red mask) can reflect area(s) or region(s) in which the optical head can safely move (and in which the fixture should therefore not overlap). Similarly, as shown in FIG. 3C (which reflects a side view of the referenced fixture), mask 332 can reflect area(s) or region(s) that correspond to the location or position of the fixture and mask 324 can reflect area(s) or region(s) in which the optical head can safely move (and in which the fixture should therefore not overlap). Upon reviewing the captured/augmented image(s), a user can provide inputs, such as inputs that confirm or approve the defined region(s) (e.g., via selectable control(s) 326, as shown), thereby validating the selected/defined dimensions of the fixture (240). In automatic validation scenarios, the inspection system can perform this process automatically, e.g., by running the validation plan with and without images of the fixture and comparing the resulting images to detect the actual fixture location.

In scenarios in which the described inspection system has additional/remote sensing capabilities, such features can further improve the initial (rough) definition of the fixture. For example, the inspection system can activate such a remote sensing capabilities (250) and maneuver the optical head (within the 'allowed' space or region) while enhancing or fine-tuning a 3D model of the fixture (260).

Additionally, in certain implementations the described technologies can be configured to load a CAD or other such file, model, representation, etc. of the fixture (270). The dimensions reflected in such a CAD/model can be used as the basis of the described validation (240).

In certain implementations, a model reflecting a representation of the referenced part (e.g., a CAD model) can be identified and/or one or more inputs corresponding to one or more dimension(s), shape(s), template(s) (e.g., a template that reflects one or more dimensions of the part), etc. of the part can be received. Based on the model, one or more dimensions of the part can be computed. Images of the part can be captured, and the captured images can be associated with the computed dimensions. For example, one or more of the captured image(s) can be presented via a graphical user interface in relation to a representation of the one or more dimensions of the part, as described herein. The computed dimensions can be validated based on the association of the one or more captured images. For example, input(s) corresponding to the association of the one or more captured images with the computed dimensions of the part can be received. Such inputs can reflect, for example, that the computed dimension(s), shape, etc. are/are not accurate with respect to the part as depicted in the image(s). In certain implementations, the computed dimension(s) can be adjusted based on the referenced input(s).

In other implementations, inputs that correspond to aspect(s) of the referenced part can be received. Such inputs can be, for example, inputs that correspond to or reflect dimension(s) of the part, a shape of the part, a template that reflects one or more dimensions of the part, a selection of a CAD model of the part, etc. Images of the part can be captured and associated with the one or more aspects. For example, one or more of the captured image(s) can be presented via a graphical user interface in relation to a representation of the aspect(s) of the part. The received aspect(s) can be validated based on the association of the captured image(s). For example, user input(s) corresponding to the association of the one or more captured images with the one or more aspects of the part can be received. Such user inputs can reflect, for example, that the one or more aspects are accurate/not accurate with respect to the part as depicted in the one or more images. Additionally, in certain implementations one or more of the received aspects of the part can be adjusted based on the user input(s).

Additionally, in certain implementations one or more inputs that correspond to one or more dimensions of the part can be received. Images of the part can be captured and the one or more captured images can be associated with the one or more dimensions. In certain implementations, one or more of the captured images can be presented, via a graphical user interface, as an overlay in relation to a representation of the dimension(s) of the part. The received dimensions can be validated based on their association with the one or more captured images. In certain implementations, user input(s) can be received via a graphical user interface that depicts at least one of the captured image(s) as an overlay in relation to a representation of the dimension(s) of the part. Additionally, in certain implementations one or more of the received dimensions can be adjusted based on the one or more user inputs, as described herein.

Figure 4:
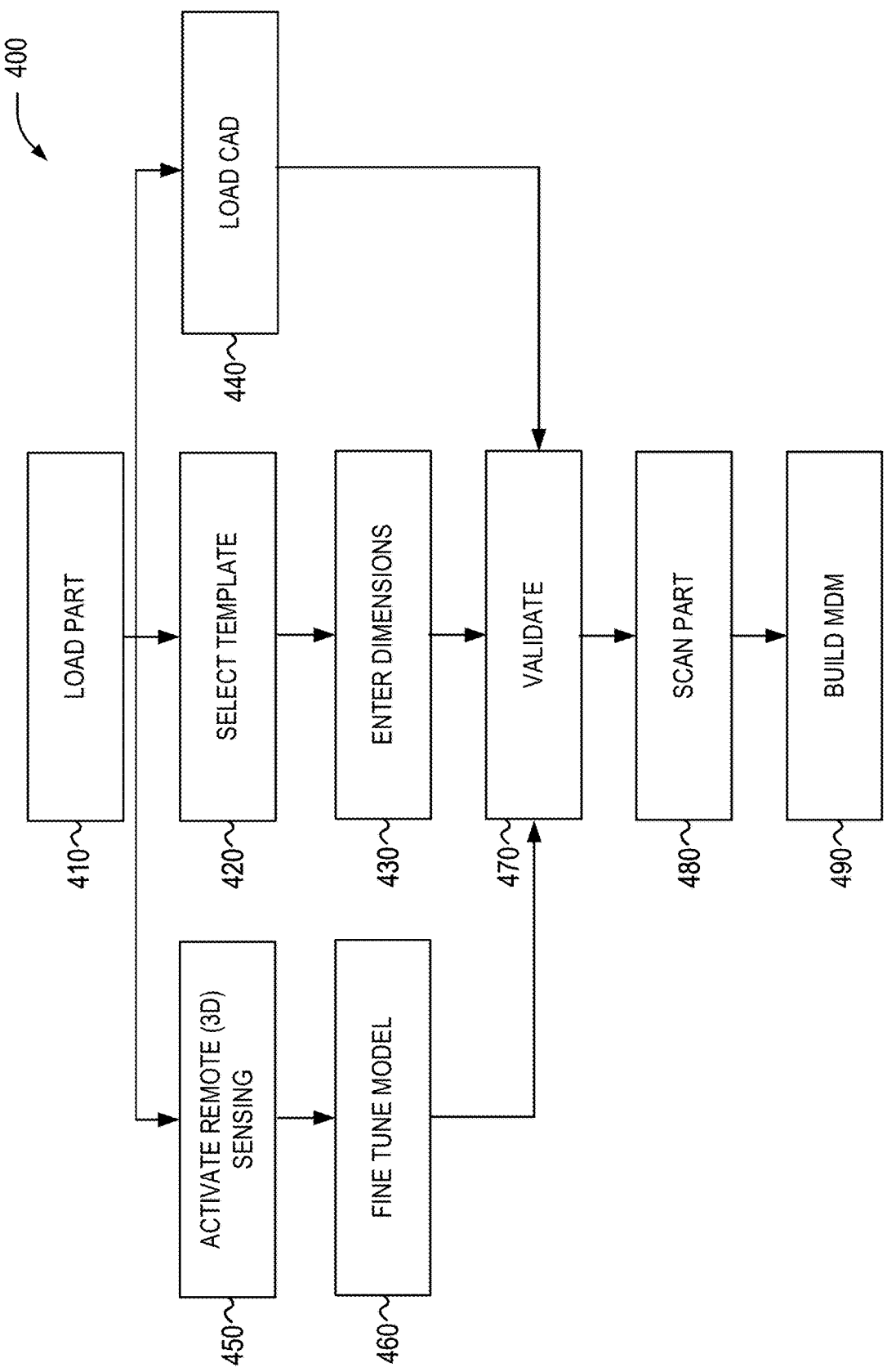
FIG. 4 is a flow chart illustrating aspects of a method for automated inspection and part enrollment, in accordance with an example embodiment.

By way of further illustration, FIG. 4 depicts an example process or method 400 through which a part to be inspected can be defined. In one implementation, method 400 is performed by one or more elements depicted and/or described in relation to FIG. 1 (including but not limited to system 100, device 150, an application executing at system 100 and/or device 150, etc.) while in some other implementations, the one or more blocks of FIG. 4 can be performed by another machine or machines. It should be understood that the described part definition process can be advantageous with respect to improving aspects of the inspection process as well as ensuring that collisions do not occur (e.g., with respect to the optical head/robotic arm).

Figure 5A:
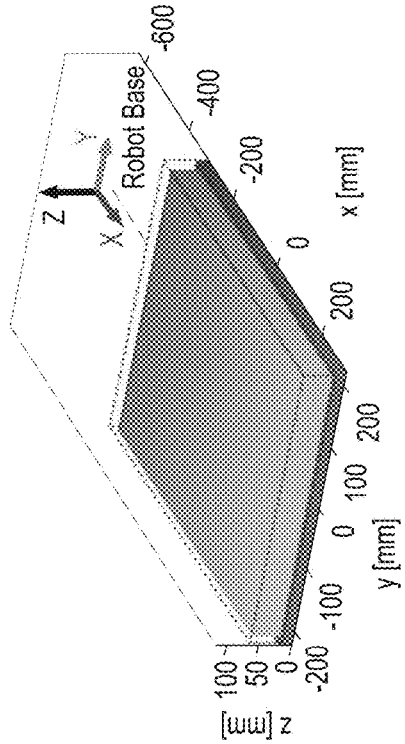
FIGS. 5A-5F illustrate example scenarios described herein, according to example embodiments.
Figure 5B:
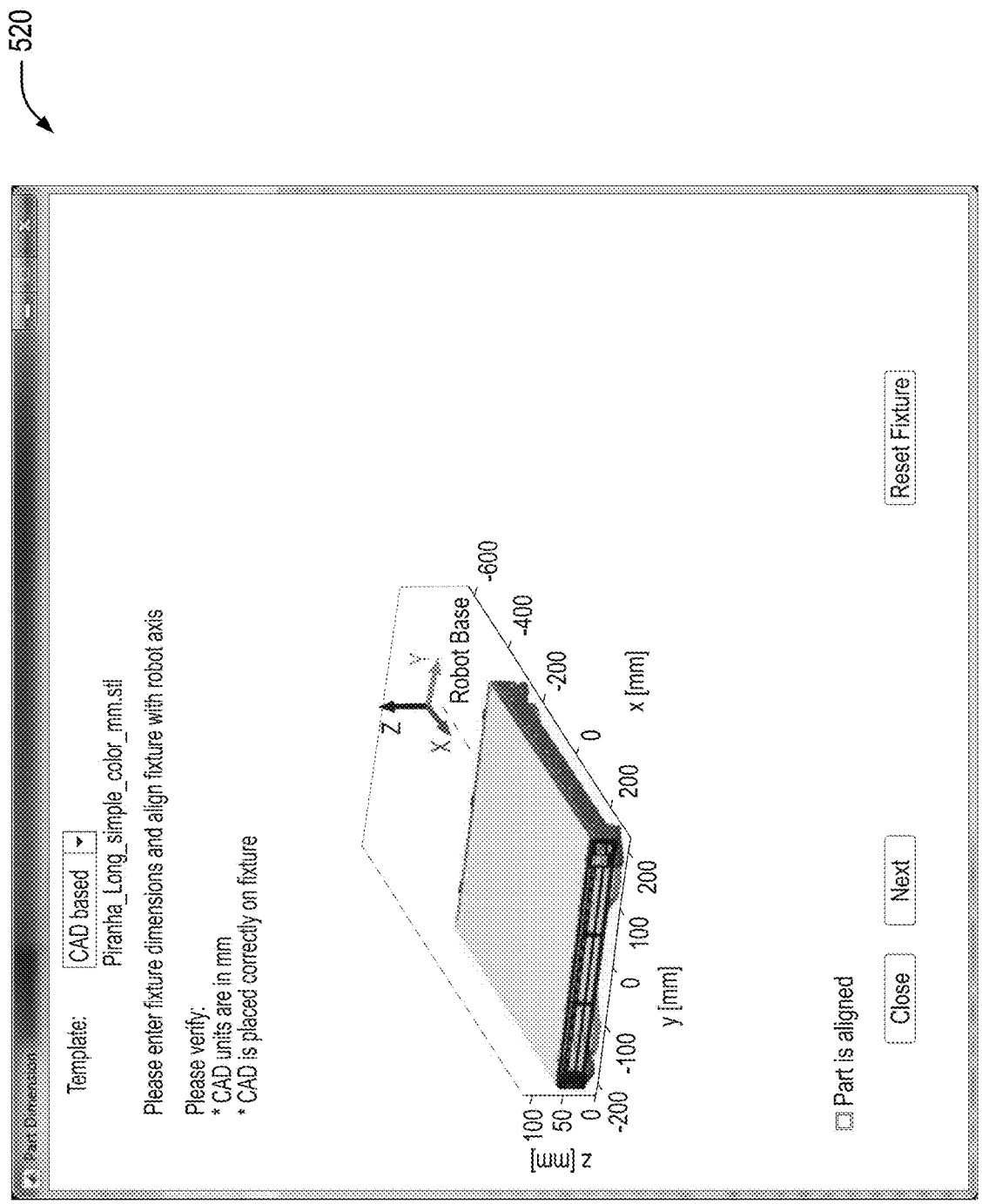

FIG. 5A depicts an example GUI 510 in which a user can provide inputs (e.g., via device 150, configured to execute an application that provides GUI 510) such as by selecting a template associated with the part to be inspected (420) and/or defining the dimensions of the part to be inspected (430) via the referenced GUI(s). Alternatively, in certain implementations inputs can be provided/received corresponding to loading a CAD model of the part and using the CAD model to define such dimensions (440). For example, FIG. 5B depicts an example GUI 520 in which a CAD model associated with the part to be inspected can be selected in order to define the shape, dimensions, etc., of the part.

In the referenced part definition process, the described inspection system can determine the precise geometry of a part (e.g., if a CAD is used to initially define the dimensions of the part) or the approximate geometry of the part (e.g., if a template such as a box, cylinder, hemisphere, etc.) is used. In certain implementations, various additional/remote sensors (e.g., other cameras) can be utilized to generate an initial rough estimation of the dimensions of a part (450). Such an initial estimate can be fine-tuned (460), e.g., in the manner described above with respect to the definition of the fixture.

Upon generating a definition (which can include/reflect, for example, dimensions, shape, and/or other aspects or characteristics of the part, as described herein) of the part to be inspected, a validation process can be performed (470). Such validation can ensure that the generated definition is consistent with the actual part to be inspected. Such a validation process can be performed in a manner similar to that described above with respect to the fixture, e.g., by capturing images of the physical part as loaded into the inspection system, and overlaying or superimposing such images on the dimensions defined by the user, CAD model, etc.

Figure 5C:
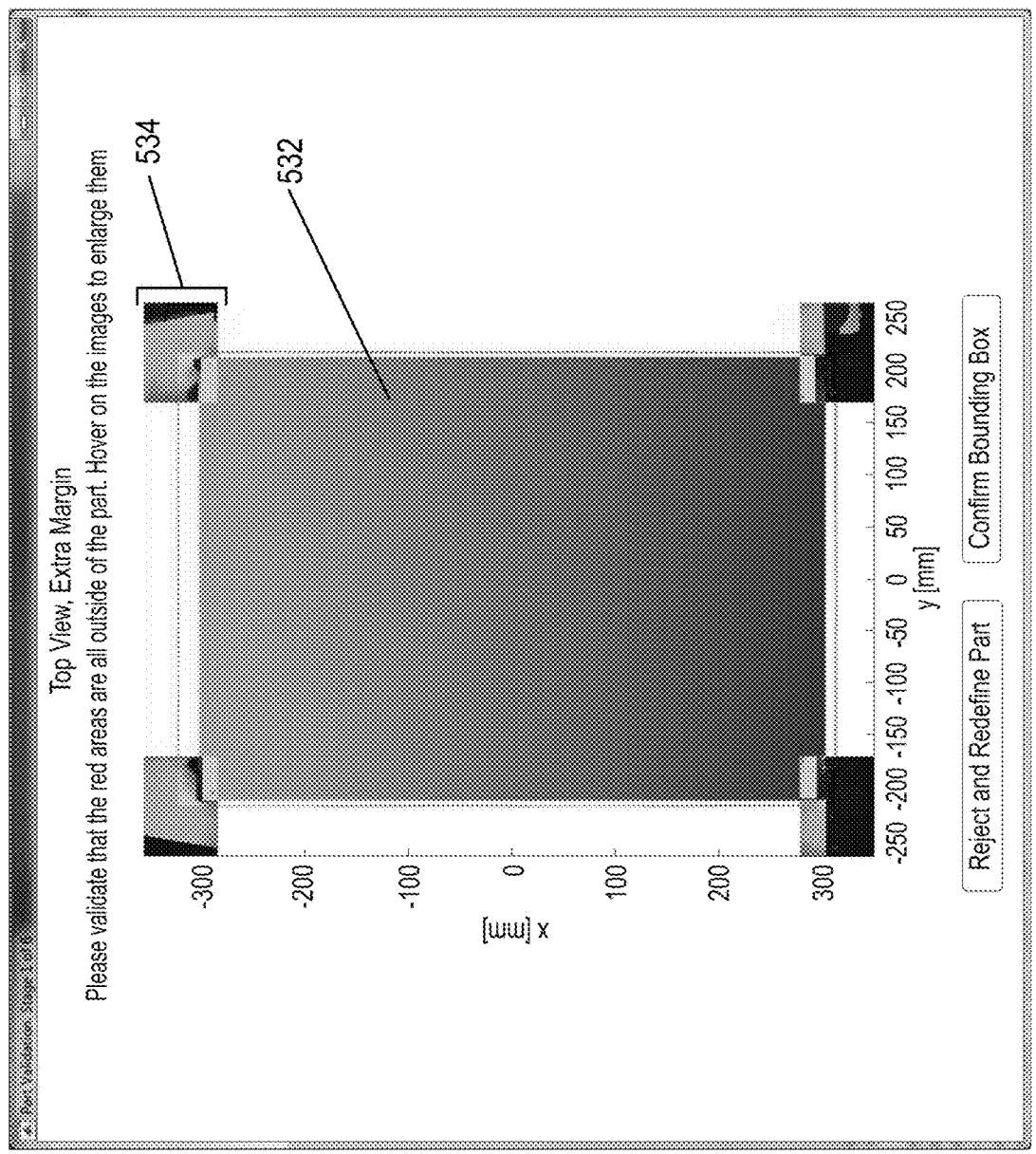
Figure 5D:
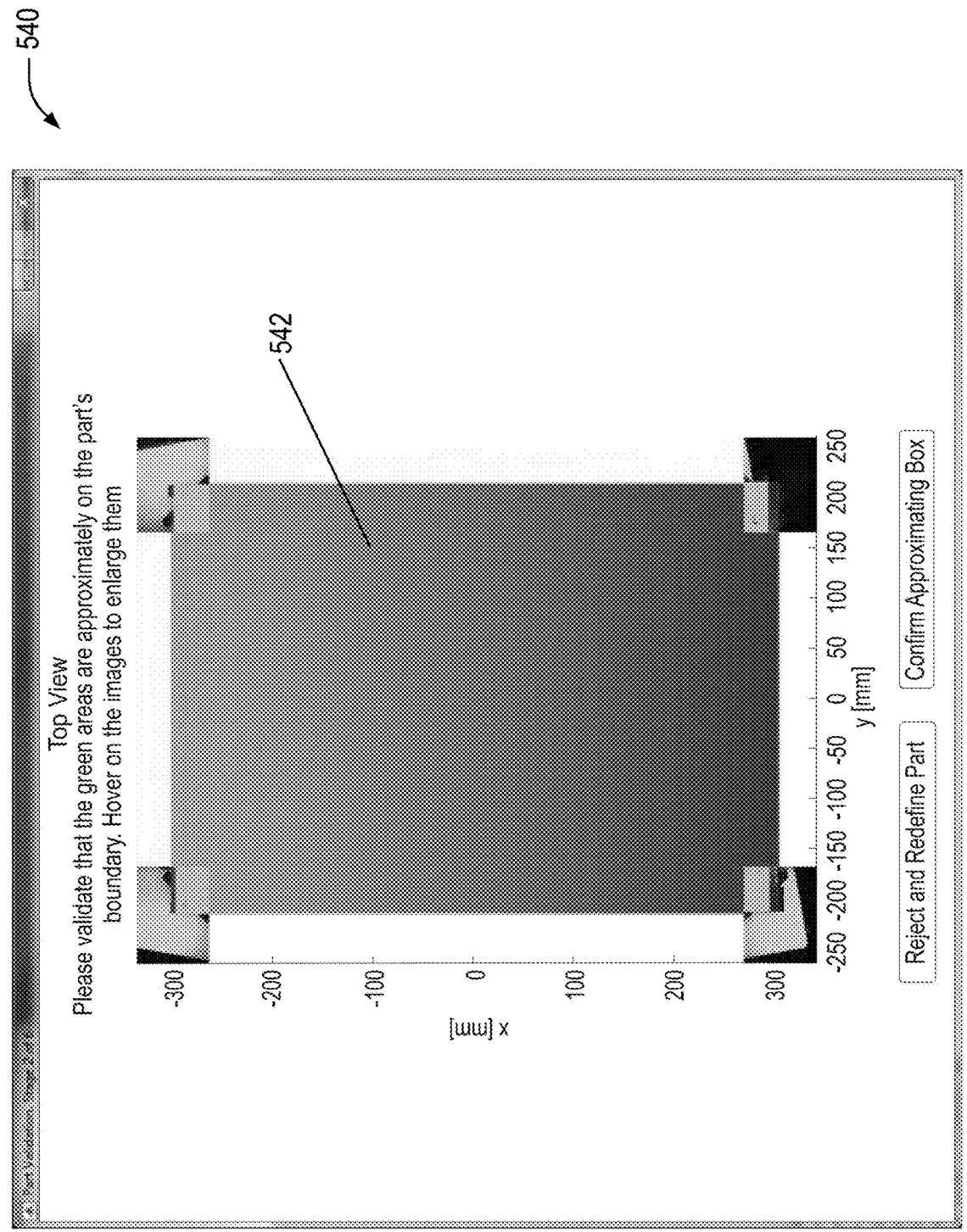

For example, FIGS. 5C and 5D depict example GUIs (530 and 540, respectively) within which a part for inspection is validated. In such a scenario, images of the actual part can be superimposed on the dimensions of the part, e.g., as defined in a manner shown in FIG. 5A or 5B and described above. In doing so, a user can review and provide various inputs, e.g., to confirm whether the defined dimensions of the part are consistent with the actual part being inspected. As noted above, in certain implementations the images can be augmented with visual indicators or 'masks' that correspond to area(s) occupied by the part (and thus the optical head should not pass through) and area(s) not occupied by the part (and thus are safe for the optical head to pass through). For example, FIG. 5C (reflecting an overhead view of the part to be inspected), mask 532 can reflect area(s) or region(s) that correspond to the location or position of the object, while mask 534 can reflect area(s) or region(s) in which the optical head can safely move (and in which the part should therefore not overlap). By way of further example, FIG. 5D shows mask 542 which reflect area(s) or region(s) that correspond to the location or position of the part.

Figure 5E:
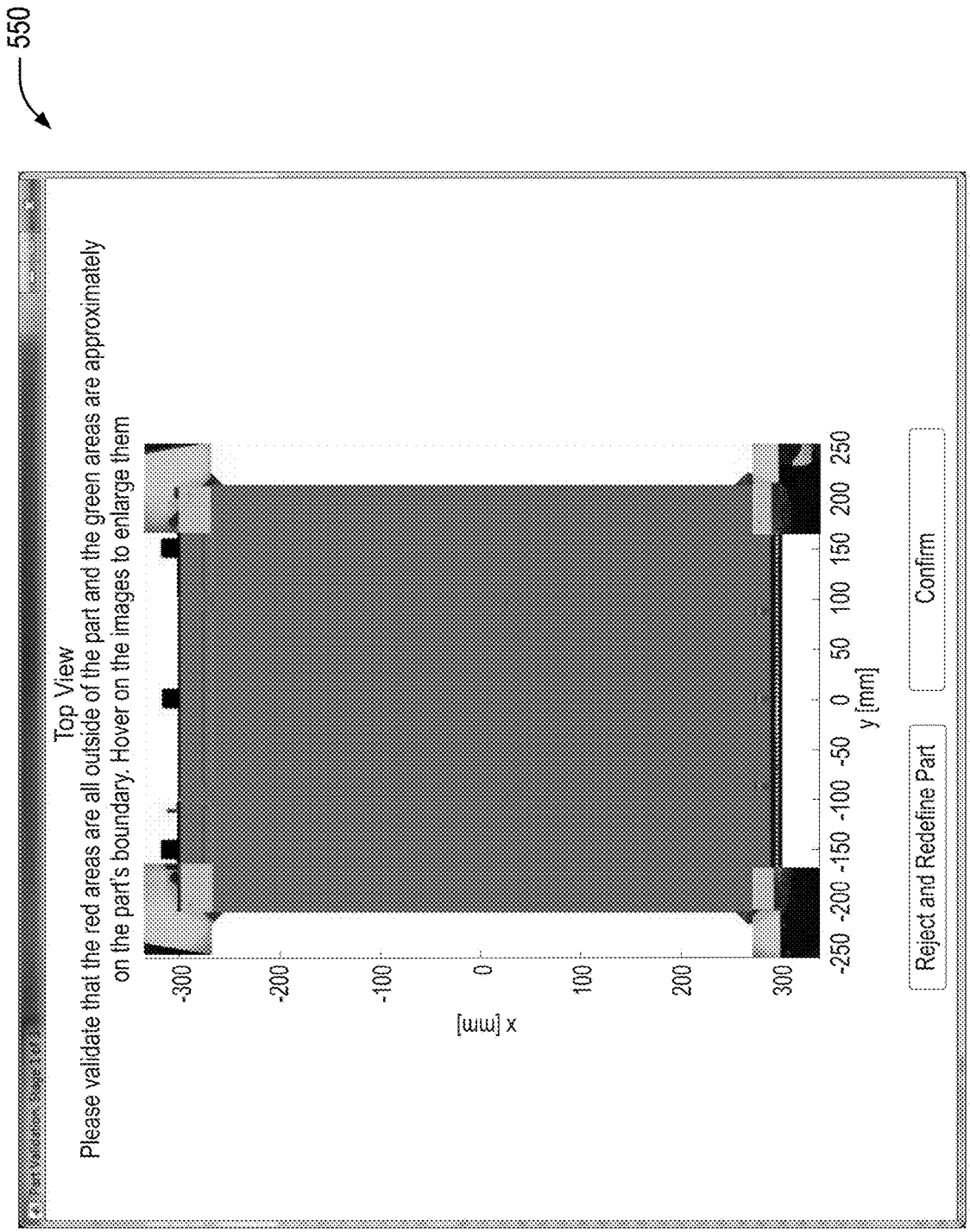
Figure 5F:
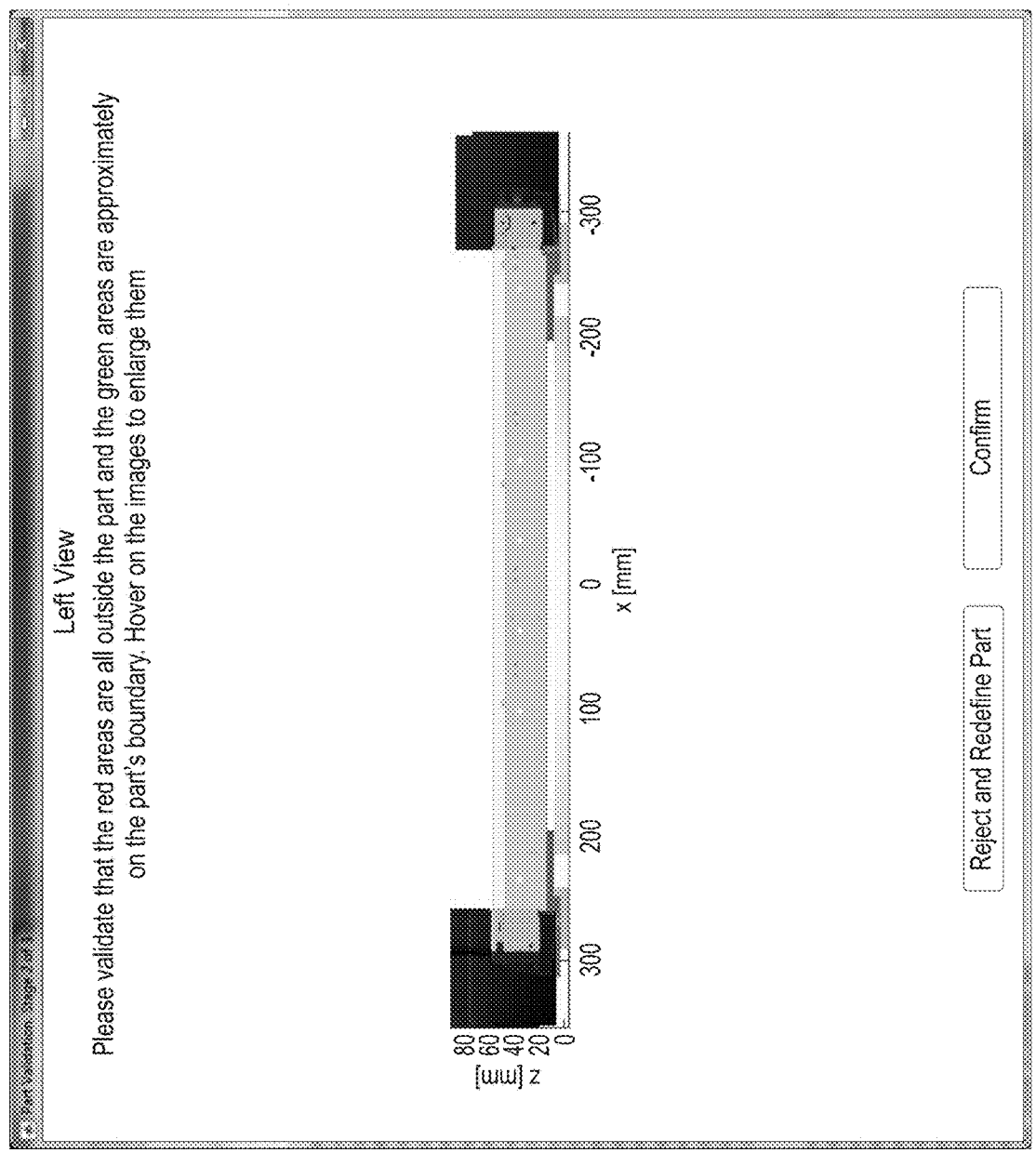

By way of yet further example, FIGS. 5E and 5F depict example GUIs (550 and 560, respectively) within which a part definition (reflecting, for example, dimensions, shape, and/or other aspects/characteristics of the part, as described herein) generated based on a CAD model is validated, e.g., against images of the actual part (as captured by the inspection system and/or other sensors). As shown in FIGS. 5E and 5F, images of the part (as introduced to the inspection system) can be superimposed on a representation of the part as reflected in the CAD model. In doing so, a user can, for example, confirm that such dimensions are accurate (as reflected in the captured images), reject such dimensions as being inaccurate (e.g., based on the captured images), and/or modify/adjust the referenced dimensions.

Upon validating the definition of the part for inspection (reflecting, for example, dimensions, shape, and/or other aspects/characteristics of the part, as described herein), the inspection system can create a dynamic plan to scan/inspect the part. Such a plan can reflect or include various instructions, operations, etc. that when implemented/executed, can configure the described system to inspect the part. For example, images can be captured from many directions (e.g., with overlaps) and/or using multiple illumination configurations (480). This image collection can be used to produce a MDM (multi-dimensional model) (490). Such a multidimensional model can include and/or otherwise incorporate any number of aspects, elements, etc. of the part. For example, the referenced multidimensional model can incorporate aspects of the part (and/or areas, regions, etc., thereof) including but not limited to: size, shape, structure (two-dimensional, three-dimensional, etc.), material composition, etc.

Following the described enrollment process, a visual representation of the part can be displayed (e.g., within a viewer/GUI). Doing so can, for example, allow the user to specify various testing requirements (e.g., at the part level).

Figure 6A:
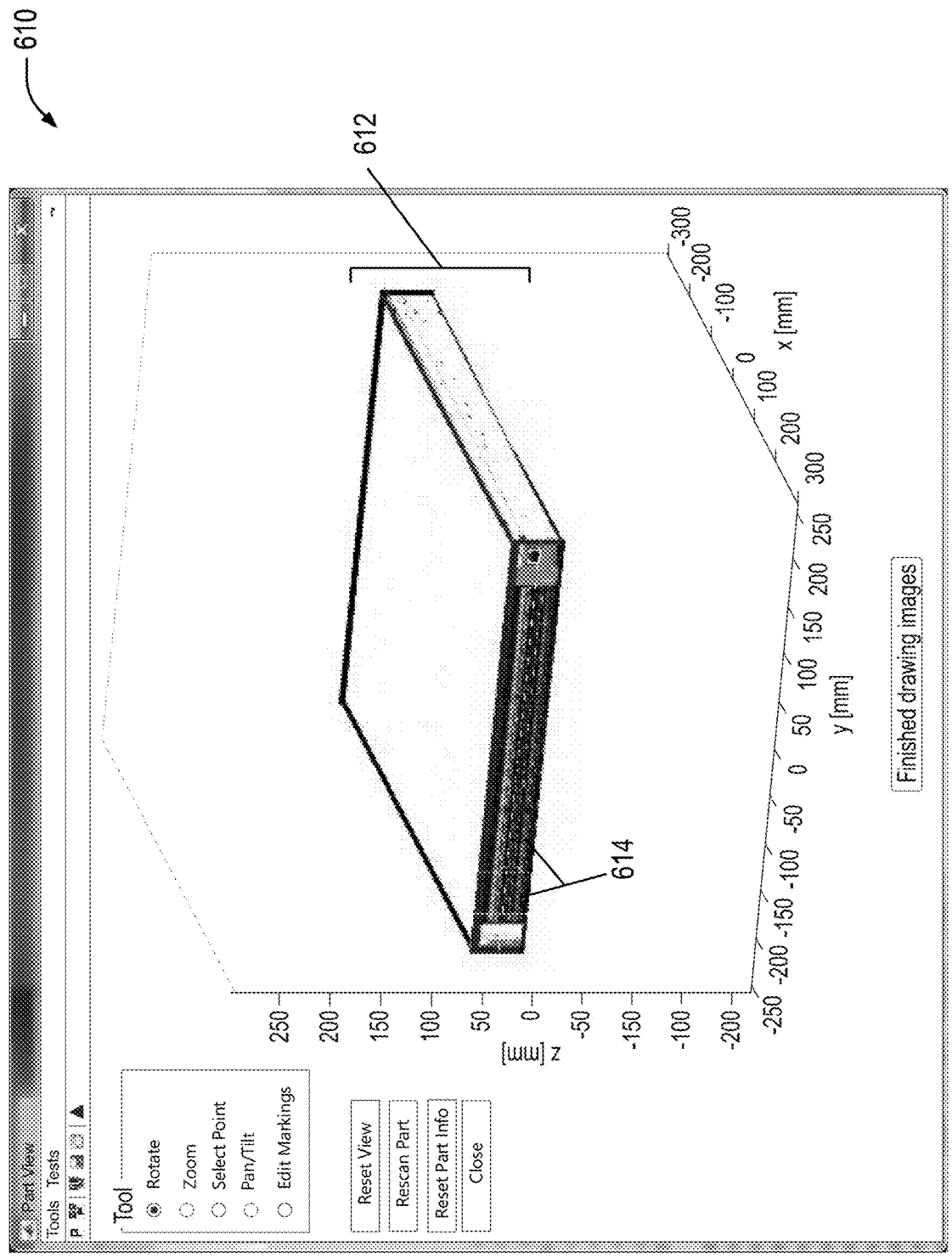
FIGS. 6A-6B illustrate example scenarios described herein, according to example embodiments.

By way of illustration, FIG. 6A depicts an example GUI 610 in which a visual representation of the various dimensions/shape of a part (e.g., as previously input or determined) can be associated with images of the actual part as captured in different locations, such as by overlaying the referenced dimensions, etc. with captured image(s) of the part. As shown in FIG. 6A, a representation of the structure of a part 612 (reflecting, for example, dimensions input by a user) can be overlaid with image(s) 614 (e.g., images of the part as loaded into the inspection system, captured by the optical head in different locations/angles). In doing so, the part can be visually represented/displayed as a collection of images that are displayed/superimposed as floating patches in 3D space at the approximate location of the area at which such images were acquired.

Figure 6B:
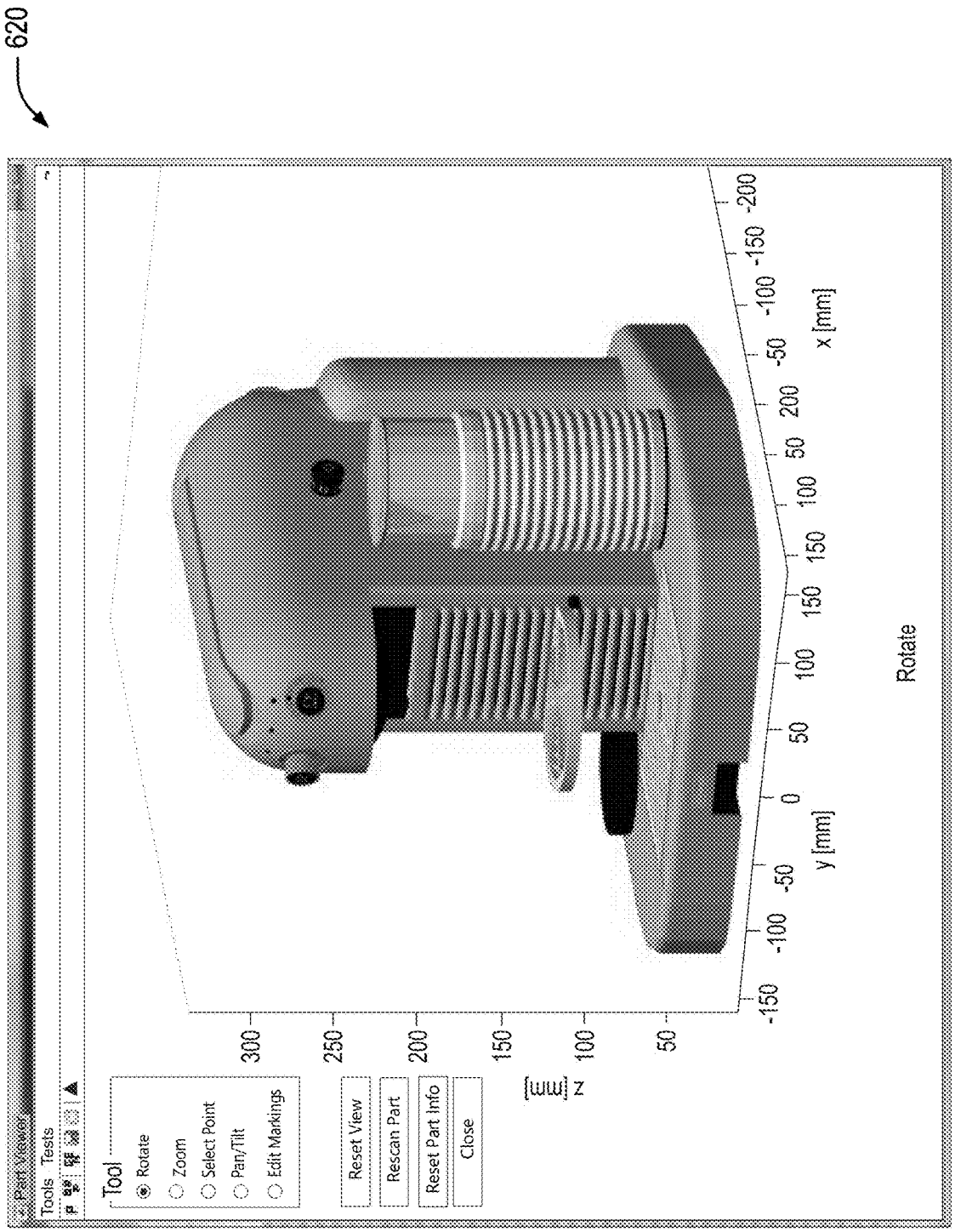

In other implementations, the part can be visually represented/displayed based on a CAD model (or other such representation) of the part. For example, FIG. 6B depicts an example GUI 620 in which a visual representation of the various dimensions/shape of a part is shown, as generated based on a CAD model of the part. In yet other implementations, a 3D model can be reconstructed using a preliminary scan of the part (which may be derived or computed based on the generated MDM).

Using the referenced GUI/viewer (e.g., as shown in FIGS. 6A-6B), the user can provide input(s) that specify various inspection/testing requirements at the part level (e.g., as opposed to at an image-based level). For example, by selecting or interacting with various controls as shown in FIGS. 6A-6B (e.g., selectable buttons), the user can adjust aspects of the view of the part (e.g., rotate, zoom, etc.) and can further adjust aspects of the part and/or the inspection to be applied to it (e.g., how to capture image(s) of the part and/or portion(s)/element(s) thereof, the conditions or configurations to be used in capturing and/or processing the referenced image(s), etc.), as described herein. Specifying such requirements, etc. can be performed in an automatic manner (e.g., based on CAD and the initial scanning), or in a semi-manual manner (e.g., using the planner motion assistant (PMA) techniques as described below).

Figure 7:
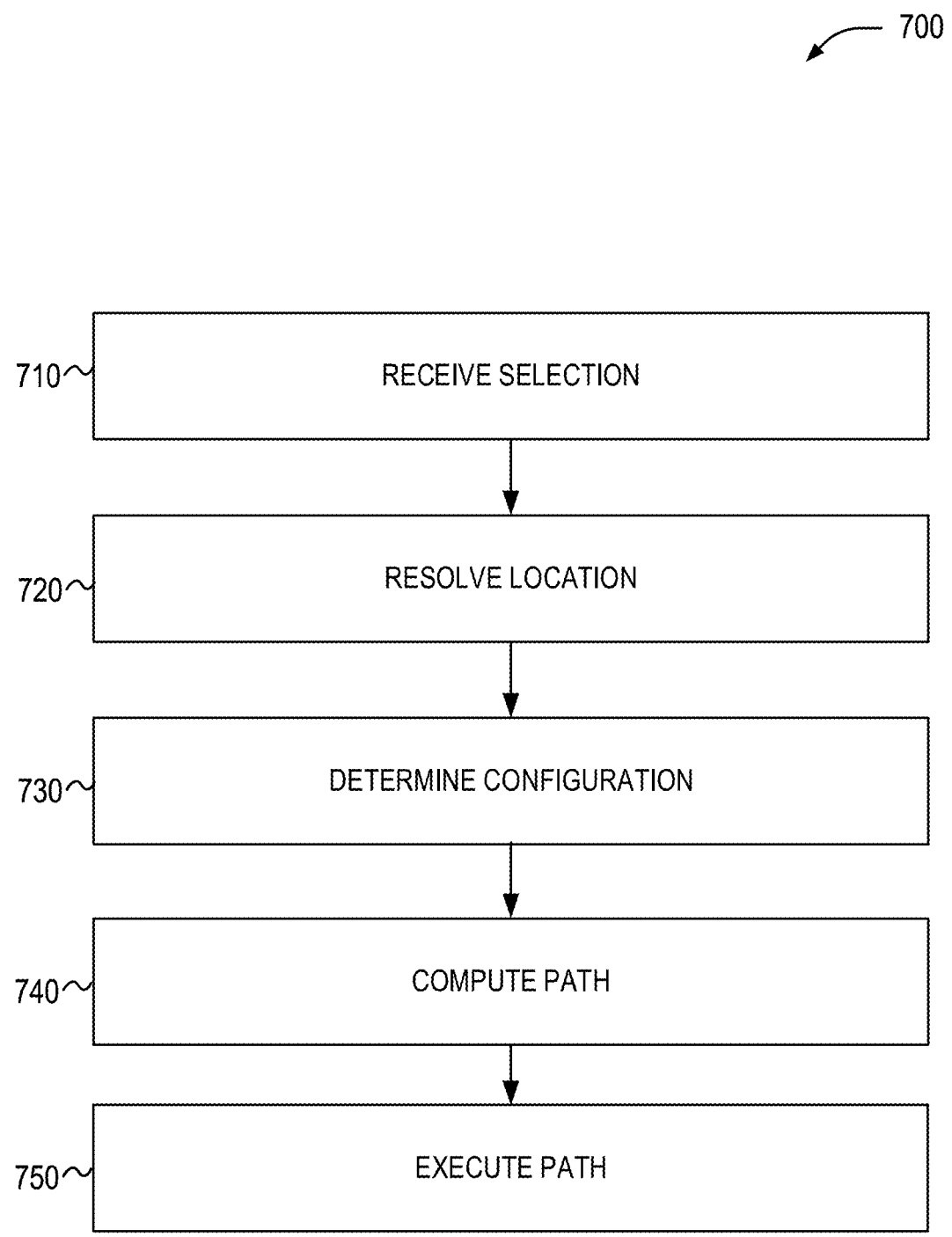
FIG. 7 is a flow chart illustrating aspects of a method for automated inspection and part enrollment, in accordance with an example embodiment.

In certain implementations, following the described enrollment process, it may be desirable or advantageous to further inspect a certain area of the part, e.g. to define a new inspection/test requirement. FIG. 7 depicts an example process/method 700 through which such further inspection can be performed. In one implementation, method 700 is performed by one or more elements depicted and/or described in relation to FIG. 1 (including but not limited to system 100, device 150, an application executing at system 100 and/or device 150, etc.) while in some other implementations, the one or more blocks of FIG. 7 can be performed by another machine or machines.

In certain implementations, a selection, e.g., of an area of a part can be received. Such a selection can be received, for example, within a graphical user interface that depicts, displays, etc. a representation of a part, as described herein. Based on the received selection (e.g., of the area of the part), a location of the selected area (and/or other aspects) can be determined. Based on the determined location, various image capture parameter(s) can be determined, computed, and/or identified (e.g., as described herein). For example, parameters, settings, etc., can be determined that are likely to generate a high-quality image of the selected area(s). In certain implementations, an inspection path (which can be, for example, instructions pertaining to the manner in which image(s) of the selected area are to be acquired/captured) can be computed with respect to the part. Such an inspection path can be computed, for example, based on the determined image capture parameters and/or the location of the selected area, as described herein. Additionally, in certain implementations the referenced inspection path can be computed to avoid collision between elements of the inspection system (e.g., the optical head, robotic arm, etc.) and the part being inspected. The computed inspection path can be executed, e.g., in relation to a part introduced into the described inspection system.

Figure 8A:
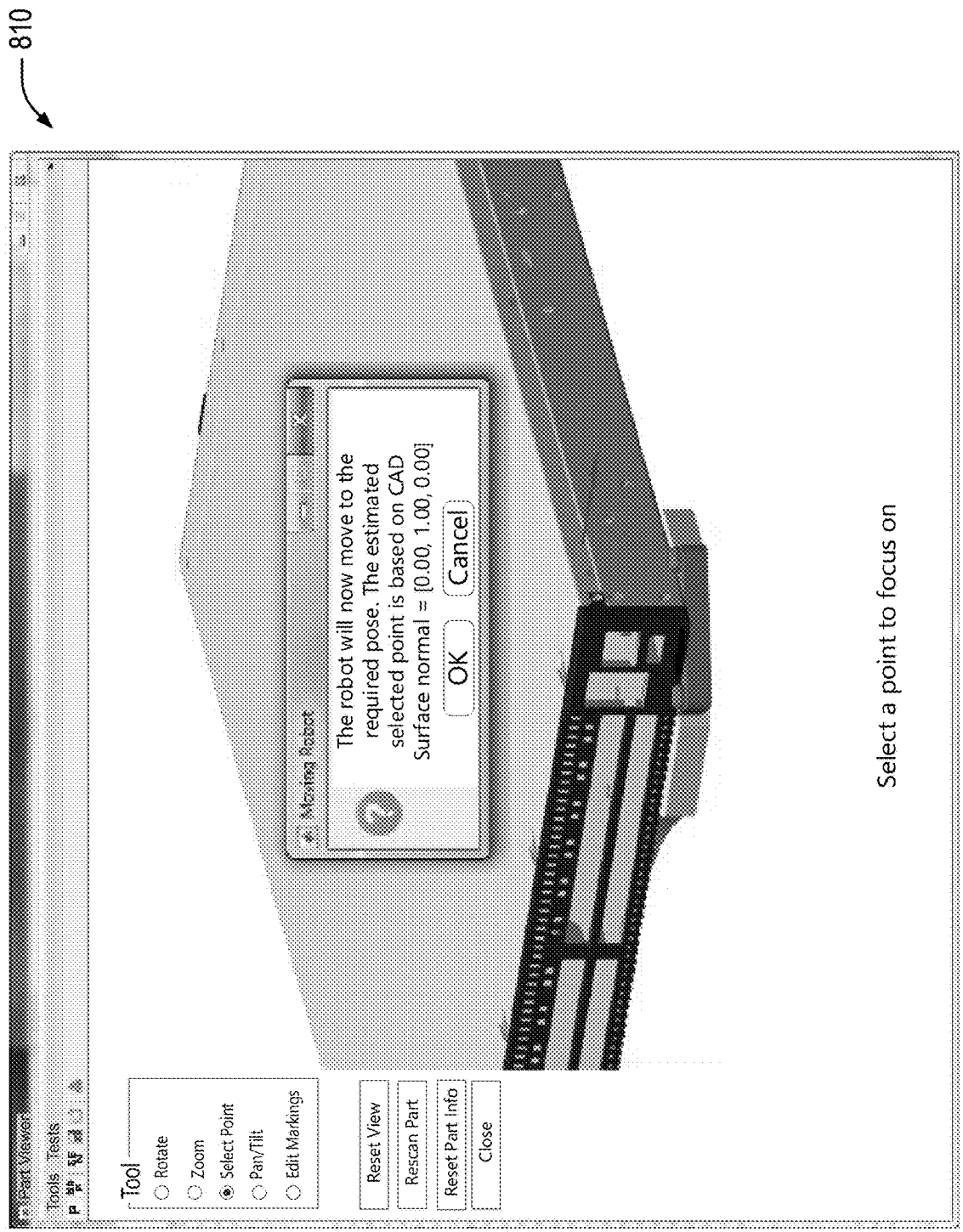
FIGS. 8A-8B illustrate example scenarios described herein, according to example embodiments.
Figure 8B:
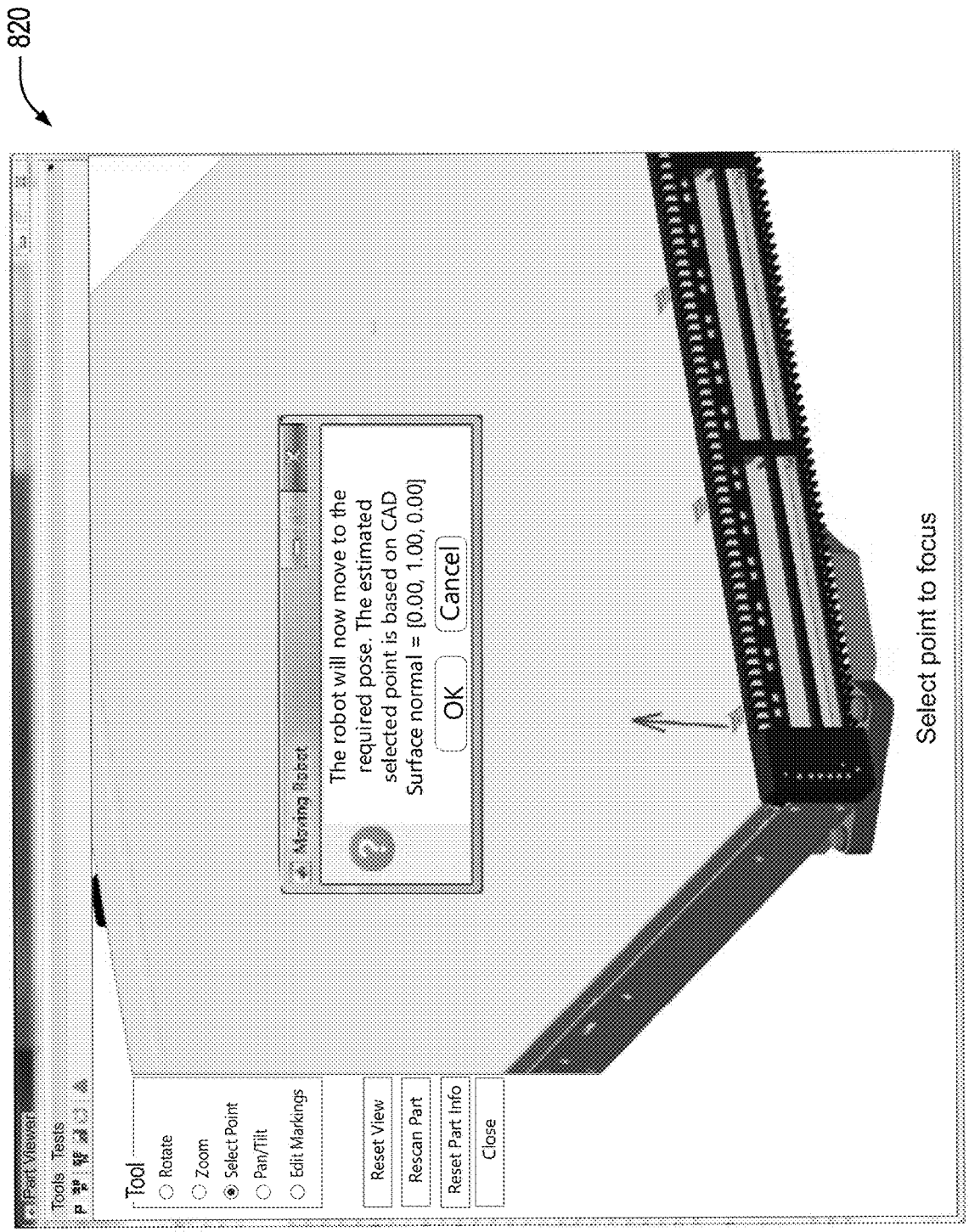

By way of further illustration, an operator of the inspection system may provide inputs, such as by using a mouse (or any other input device/interface) to click/select an area/region within the part viewer/GUI (710). For example, FIGS. 8A-8B depict example GUIs (810 and 820, respectively) showing scenarios in which a user has selected a specific area or region of a part. Doing so can generate/provide an instruction to maneuver the optical head/robotic arm to acquire image(s) of the selected area. To complete this task, the inspection system can resolve/determine the location and orientation of the selected point in 3D space (720). Then, the system can further determine/resolve a compatible configuration of the system (including, for example, parameters, settings, etc., as described herein) in which a relatively good/high-quality image of the area may be taken (considering various system parameters, such as the system reach, optical head's working distance, etc.) (730). It should be understood that that the referenced system configuration may include the robot's and external joints' positions. Next, the inspection system can compute a safe (e.g., collision-free) and efficient path from the optical head's current position to the required position (740), and execute the computed path (750).

In certain implementations, one or more elements (e.g., components, component type(s) and/or sub-types, etc.) included within the part can be identified, e.g., within a model that corresponds to the referenced part. As described in detail herein, various testing parameters can be associated with the identified element(s).

In certain implementations, various selection(s) of the referenced testing parameters can be received (e.g., in order to associate such parameters with the identified elements). For example, images of the referenced part (e.g., as captured by the described inspection system) can be presented within a graphical user interface. Selection(s) of various region(s) can be received within the graphical user interface (e.g., selections of image(s) that correspond to the referenced element(s)). Such selected region(s) can be associated with various testing parameters (e.g., testing parameters that correspond to or are associated with the selected elements), as described herein.

Figure 9:
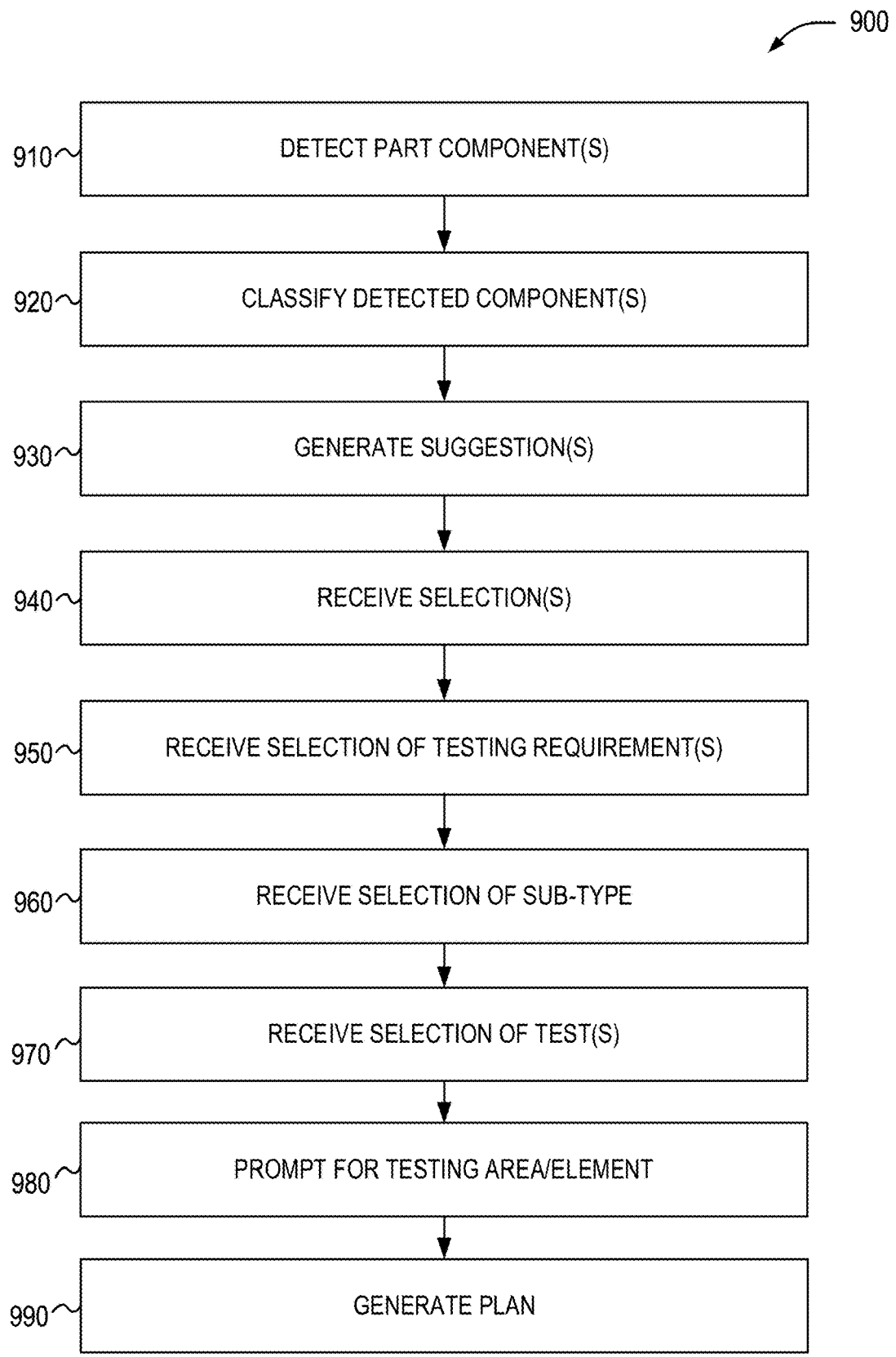
FIG. 9 is a flow chart illustrating aspects of a method for automated inspection and part enrollment, in accordance with an example embodiment.

By way of further illustration, following the described enrollment process, various testing/inspection requirements can be defined or specified. FIG. 9 depicts an example process/method 900 through which such requirements can be defined or specified. In one implementation, the method 900 is performed by one or more elements depicted and/or described in relation to FIG. 1 (including but not limited to system 100, device 150, an application executing at system 100 and/or device 150, etc.) while in some other implementations, the one or more blocks of FIG. 9 can be performed by another machine or machines.

In certain implementations, an operator or administrator may input or specify various requirements, parameters, etc. for the part. Such requirements, parameters, etc., can define or dictate various aspects of the manner in which a part (or a portion thereof) is to be inspected. In other implementations, the inspection system can be configured to perform such functions in an automatic or automated manner, e.g., by detecting components and/or sub parts within the part to be inspected, and generating suggestions with respect to requirements, parameters, etc. to be applied with respect to the testing/inspection of those parts. In doing so, the described inspection system can generate an inspection plan that, when executed, addresses or provides information regarding such requirements in an optimized/efficient manner.

In certain implementations, the described inspection system can analyze the referenced MDM and/or the preliminary dynamic part images to detect, segment and/or classify common components/elements (e.g. ports, screw, cables, etc.) (e.g., using computer vision and machine (deep) learning techniques/algorithms) (910, 920). For example, an MDM generated with respect to a part can be processed to identify ports or screws within the part that are likely to be necessary to inspect. In certain implementations, such elements can be detected based on the identification of comparable elements (screws, ports, etc.) with respect to other parts.

Additionally, in certain implementations the inspection system can process or analyze the CAD model (if available) to directly extract such components (e.g., screws, ports, etc., which are likely to be necessary to inspect). Such components can be identified or extracted based various factors such as semantic metadata and attributes attached to the components within the CAD model (e.g., component model, brand, dimensions, given name, etc.).

The inspection system can also classify detected components into sub types (e.g. RJ45 post, Philips screw, etc.) and/or suggest to the user that certain detected components should be tested (or initiate such tests automatically) (930). For example, a screw can be identified and subsequently classified as a particular type of screw (e.g., Philips screw). By way of further example, a port can be identified ad subsequently classified as an RJ45 port. Such classification can enable inspection requirements associated with such component types to be applied to a particular part. Accordingly, in certain implementations, during inspection of a part determined to include a particular component (e.g., Philips screws), the described inspection plan can include a determination that the screws utilized are Philips screws (not other types).

As noted, in certain implementations a user or administrator may monitor and/or provide input or feedback regarding various aspects of the described process. For example, a user may accept, edit and/or reject various suggestions or proposals generated by the inspection system, such as suggestions regarding the application of certain tests to certain components/areas of the part (940).

Figure 10A:
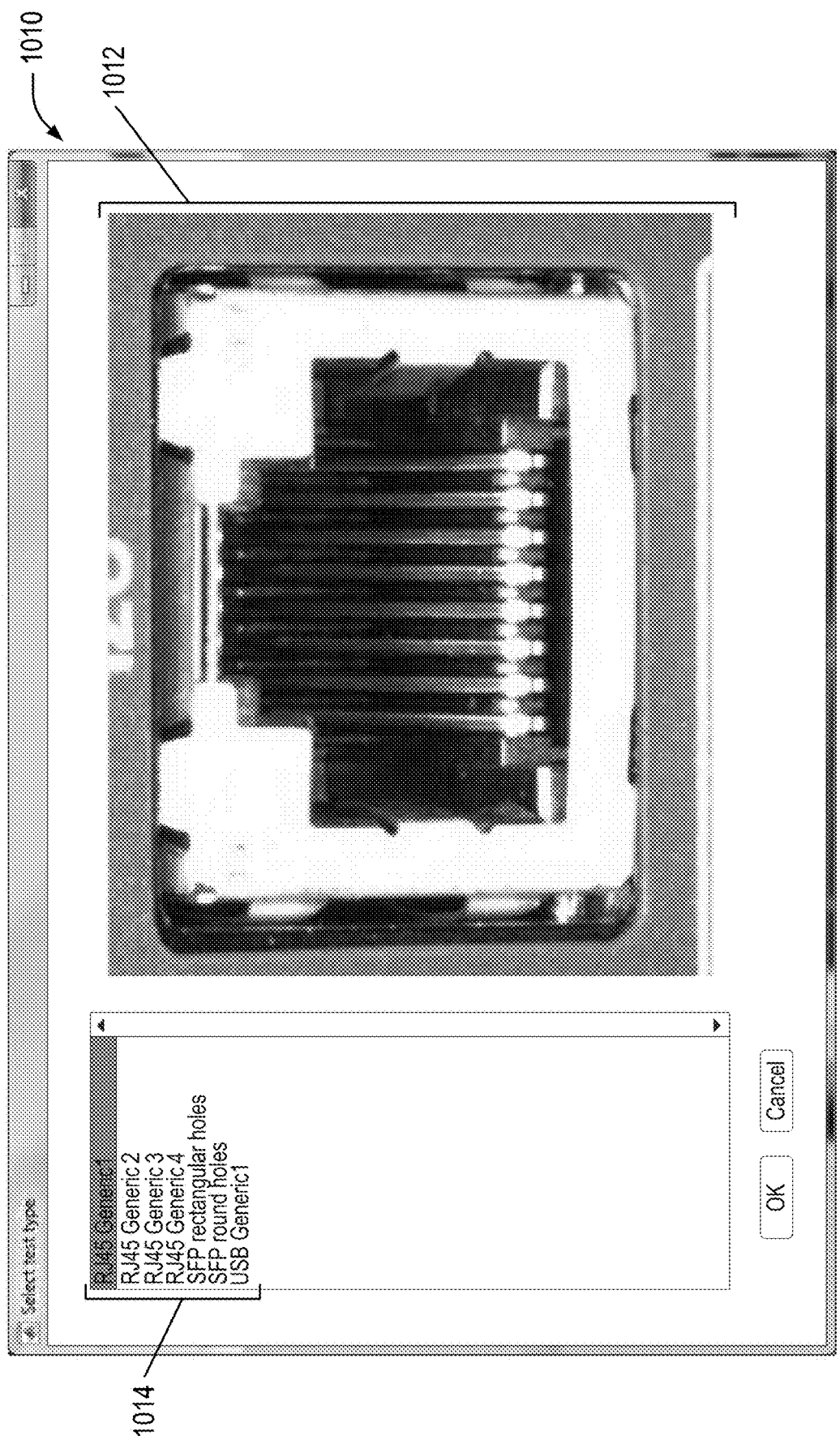
FIGS. 10A-10D illustrate example scenarios described herein, according to example embodiments.

The user may also manually define or add various inspection/testing requirements (950). For example, a user can select a testing requirement (e.g., with respect to a port). In doing so, the user may be further prompted to select further options, such as a sub type requirement (e.g. to test the port as a RJ45 port) (960). By way of illustration, FIG. 10A depicts an example interface/GUI 1010 within which a user can select the port type (here, RJ45) associated with the test/inspection to be performed. As shown in FIG. 10A, the identified port (e.g., an image 1012 of the port captured by the inspection system) can be presented to a user together with various options 1014 corresponding to different port types. The user can select a port type that corresponds to the port depicted in the image. In doing so, testing requirements/parameters associated with the selected port can be applied when inspecting the referenced part (e.g., to determine that the correct type of port is present in the items).

Figure 10B:
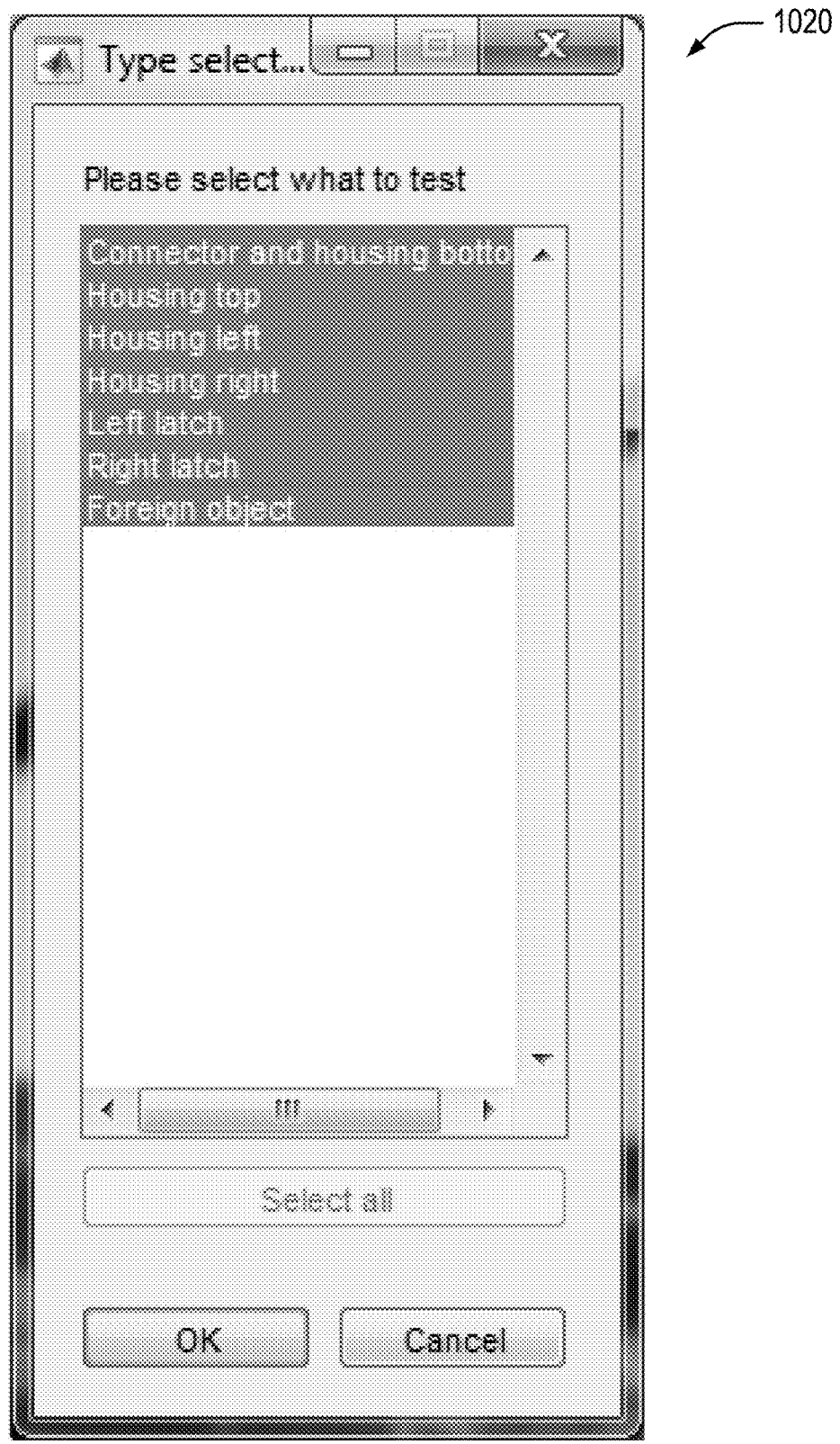

In certain implementations, the user can also specify which of various available tests are to be conducted, e.g., to check springs, check housing, check foreign objects, etc. (970). For example, FIG. 10B depicts an example interface/GUI 1020 within which a user can select aspects, features, etc. that are to be tested/inspected for. As shown in FIG. 10B, one or more tests can be selected and associated with a particular component or region within the part. It should be understood that the referenced tests can include or reflect different types of inspection operations (e.g., capturing images of the referenced component/area at different locations, under different conditions, etc., and/or processing such images to compute various determinations, e.g., the presence of a particular component, absence of scratches, etc.).

Figure 10C:
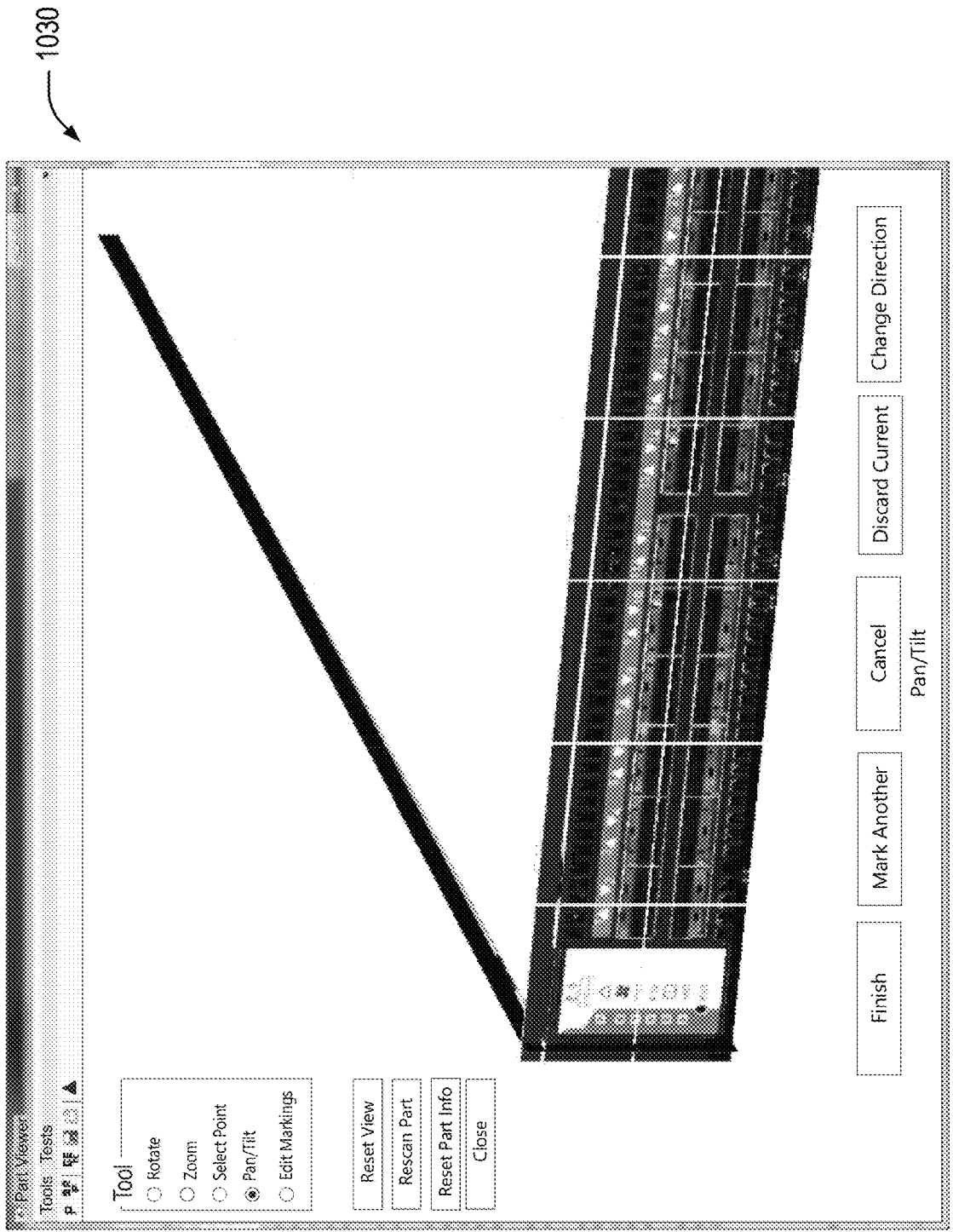

As noted, in certain implementations area(s) or components of the part can be selected, e.g., in order to apply certain tests to such selected components/areas. For example, FIG. 10C depicts an example GUI 1030 in which the user can select or mark areas/elements (e.g., region or component 1032) and can further define the inspection test(s) to be applied to such area, as well as other test requirements, settings, etc. (980), as described herein.

Figure 10D:
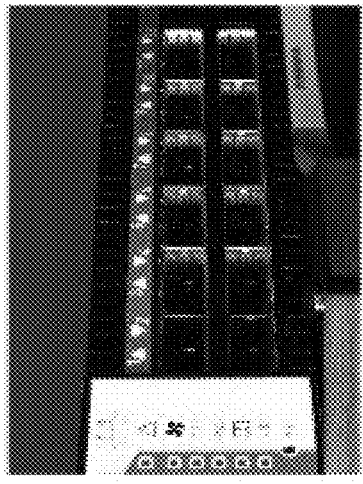

Additionally, in certain implementations the user may provide input/feedback, such as accepting or rejecting various captured images. For example, FIG. 10D depicts an example GUI 1040 in which various images captured by the described inspection system can be reviewed and accepted or rejected (e.g., by a user). By way of illustration, having identified and/or selected various components within a part and further selected/identified testing parameters with respect to such elements/areas, various images (corresponding to images of the references elements/areas under conditions defined by the selected/determined testing requirements) can be presented to the user. The user can then select which images do (or do not) meet the requirements for the referenced inspection.

Based on the described determinations and/or selections, an inspection plan can be generated (990). In certain implementations, such an inspection plan can include and/or account for the identified/selected elements/areas of the part, various testing requirements/parameters associated with such elements/areas, and/or selections provided (e.g., that certain image(s) do/do not meet the requirements for the referenced inspection. When executed, addresses or provides information regarding such requirements in an optimized/efficient manner.

In certain implementations, one or more images of the part can be captured, e.g., during an execution of an inspection path (e.g., as described herein). Moreover, in certain implementations various previously captured images can be loaded. Such images can be presented via a graphical user interface. A selection with respect to at least one of the captured image(s) can be received. Such a selection can, for example, accept or reject at one or more captured images. Based on the selection of at least one of the referenced captured images, an inspection plan can be generated with respect to the part and such a generated inspection plan can further be executed with respect to the referenced part and/or another part. In certain implementations, such an inspection plan can be generated with respect to the part based on the computed inspection path and/or the one or more image capture parameters, as described herein. In certain implementations, such an inspection plan can be adjusted to account for one or more limitations of the described inspection system. Additionally, in certain implementations various testing parameter(s) can be associated with at least one of the one or more images. For example, in certain implementations one or more first testing parameters can be associated with a first one of the one or more images and one or more second testing parameters can be associated with a second one of the one or more images.

Figure 11:
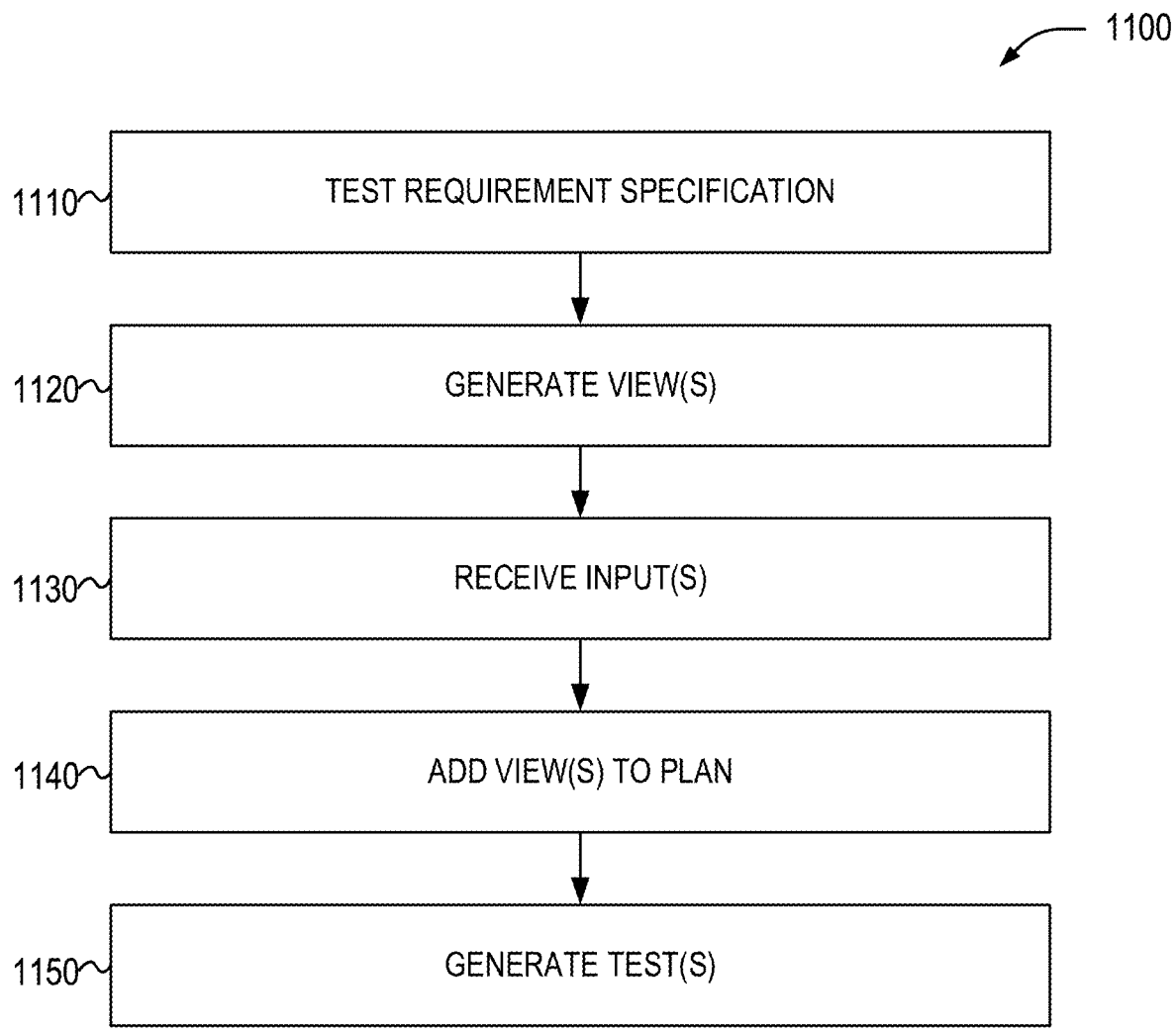
FIG. 11 is a flow chart illustrating aspects of a method for automated inspection and part enrollment, in accordance with an example embodiment.

By way of further illustration, FIG. 11 depicts an example process 1100 through which an inspection plan can be generated. In one implementation, method 1100 is performed by one or more elements depicted and/or described in relation to FIG. 1 (including but not limited to system 100, device 150, an application executing at system 100 and/or device 150, etc.) while in some other implementations, the one or more blocks of FIG. 11 can be performed by another machine or machines.

In certain implementations, following the described test specification process (1110), the inspection system can generate views (1120) (corresponding to optical head configurations which can include position, illumination, etc.) from which it will acquire images during inspection. Such views can be presented to a user who can be given the option to accept/reject the views (1130). The accepted views can be added to the inspection plan for the part (1140). For these images, image-level tests can be generated (1150) that fulfill the defined testing requirements (e.g. to check for the existence of a port spring in one of the images). The system can also generate a dynamic inspection plan to acquire the images and execute/implement such a plan (during which the user may accept or reject captured images).

The inspection system can then further adjust, improve, or optimize the generated acquisition path for maximum efficiency. For example, in certain implementations various hardware configurations (e.g., positions of the optical head, robotic arm, etc.) may be preferable (e.g., for capturing images under certain conditions) but may not be feasible (e.g., due to potential collision of the optical head with some other part of the tested object or alternatively the machine itself). Accordingly, the inspection system can improve or optimize such inspection plans to account for the referenced limitations while attaining results that meet (or closely approximate) the inspection requirements.

Additionally, in certain implementations the inspection system can be further configured to perform the referenced inspection/testing as much as possible based on images that have been captured (e.g., in lieu of capturing additional images of the same/similar regions). In doing so, motion of the various components (e.g., the optical head and robotic arm) can be reduced (as well as reducing the amount of redundant data acquired/processed).

Accordingly, it can be appreciated that the described technologies enable and/or facilitate the defining of various test parameters, requirements, etc., e.g., in relation to a model of the part to be inspected. The described technologies can further automatically convert the referenced parameters, requirements, etc., into a full inspection plan. Such an inspection plan can include motion, acquisition and/or the test definitions, which can specify operations, processes, tests, etc. that need to be run (e.g., on various computed/identified regions, areas, etc., e.g., within the described generated images, as well as the parameters these operations, processes, tests, etc. should use for the tests.

It should also be noted that while the described techniques and technologies are described herein primarily with respect to product inspection (e.g., using inspection systems such as are depicted and described herein), the described techniques/technologies are not so limited. Accordingly, the described techniques/technologies can be similarly implemented and/or employed in other settings and contexts and towards any number of additional objectives. Further technical advantages, solutions, and/or improvements (beyond those described and/or referenced herein) can be enabled as a result of such implementations.

By way of illustration, in certain implementations the described technologies can be employed with respect to larger scale inspections, such as inspections of larger structures such as buildings, bridges, roads, tunnels, etc. In such implementations, a vehicle (equipped with various camera(s), sensors, etc.) can be used to maneuver in relation to (e.g., around and/or within) such a structure. Examples of such vehicles include but are not limited to maimed vehicles such as a car, bicycle, etc., unmanned vehicle such as an Unmanned Aerial Vehicle (UAV) or 'drone,' remote-controlled car, boat, etc. or any other such maneuverable device. In such implementations, the referenced vehicles or maneuverable devices can be configured to perform an initial inspection (e.g., on a prototype or ideally constructed structure) and/or model(s) that define the ideal/intended dimensions and characteristics of such a structure can be processed. In doing so, an inspection plan (e.g., for the actual structure, etc., to be inspected) can be computed. As described herein, various considerations can be accounted for in computing such an inspection plan. For example, one or more important or crucial areas of the structure to be inspected can be identified and the path in which the vehicle maneuvers in performing the referenced inspection can account for the prioritization of such areas. By way of further example, certain technical limitations of the vehicle/device can be accounted for (e.g., battery limitations that may affect flight time of a drone, limitations on where the vehicle may or may not travel, altitude/reception limits, etc.) in computing the referenced inspection plan. In doing so, the described technologies can enable the referenced structure to be inspected in a manner that is likely to be most efficient and effective. Having computed the referenced inspection plan, the vehicle can execute the plan, such as in a manner described herein (e.g., with respect to product inspection).

It should also be understood that the components referenced herein can be combined together or separated into further components, according to a particular implementation. Additionally, in some implementations, various components of a particular device may run on separate machines.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-11 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 12:
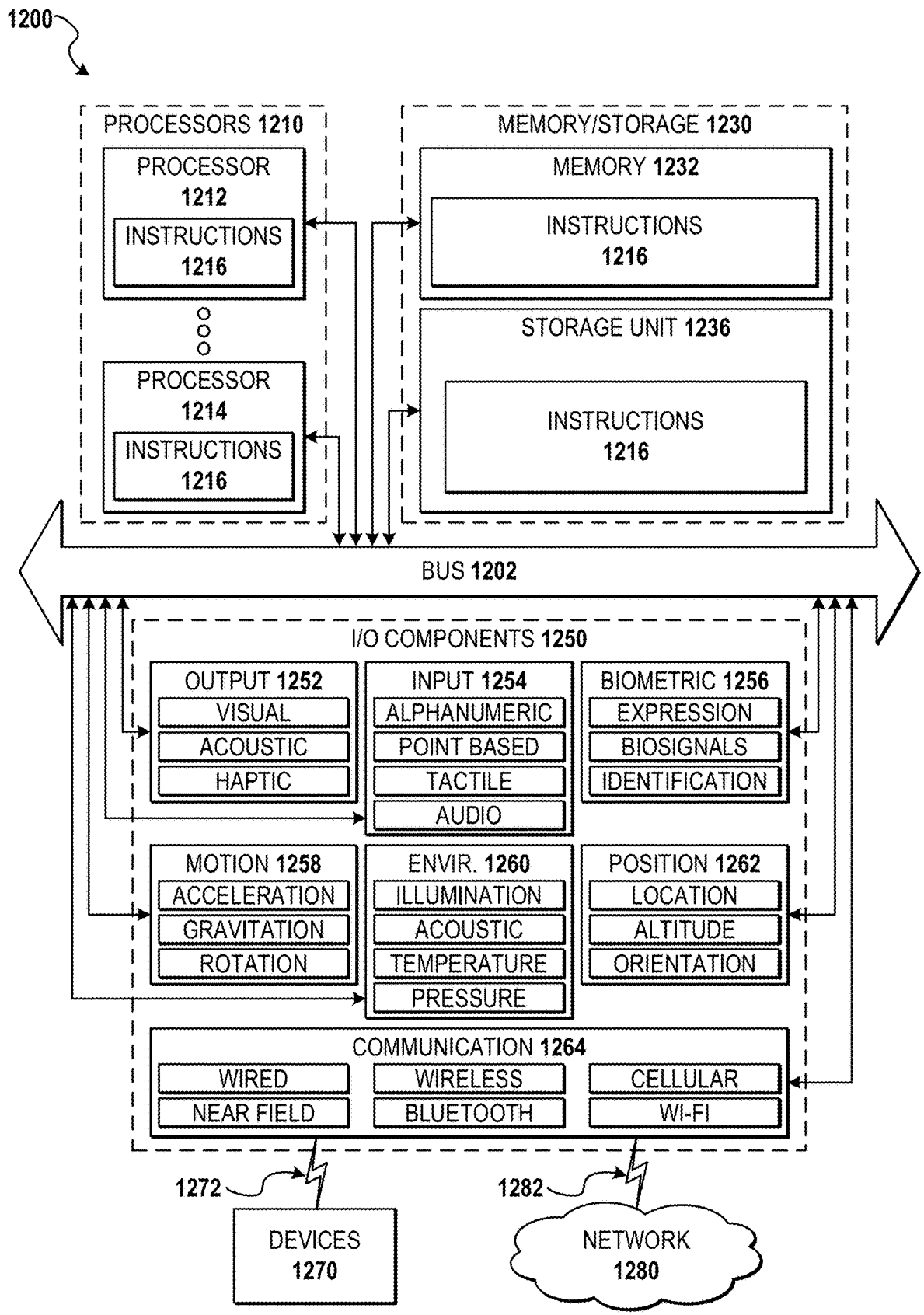
FIG. 12 is a block diagram illustrating components of a machine able to read instructions from a machine-readable medium and perform any of the methodologies discussed herein, according to an example embodiment.

FIG. 12 is a block diagram illustrating components of a machine 1200, according to some example implementations, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. The instructions 1216 transform the general, non-programmed machine into a particular machine programmed to carry out the described and illustrated functions in the manner described. In alternative implementations, the machine 1200 operates as a standalone device or can be coupled (e.g., networked) to other machines. In a networked deployment, the machine 1200 can operate in the capacity of a server machine or a client machine in a server-client network environment, or as a peer machine in a peer-to-peer (or distributed) network environment. The machine 1200 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 can include processors 1210, memory/storage 1230, and I/O components 1250, which can be configured to communicate with each other such as via a bus 1202. In an example implementation, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1212 and a processor 1214 that can execute the instructions 1216. The term "processor" is intended to include multi-core processors that can comprise two or more independent processors (sometimes referred to as "cores") that can execute instructions contemporaneously. Although FIG. 12 shows multiple processors 1210, the machine 1200 can include a single processor with a single core, a single processor with multiple cores (e.g., a multi-core processor), multiple processors with a single core, multiple processors with multiples cores, or any combination thereof.

The memory/storage 1230 can include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 can also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions (e.g., instructions 1216) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 can include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 can include many other components that are not shown in FIG. 12. The I/O components 1250 are grouped according to functionality merely for simplifying the following discussion and the grouping is in no way limiting. In various example implementations, the I/O components 1250 can include output components 1252 and input components 1254. The output components 1252 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 1250 can include biometric components 1256, motion components 1258, environmental components 1260, or position components 1262, among a wide array of other components. For example, the biometric components 1256 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 can include acceleration sensor components (e.g., accelerometer), gravitation sensor components, rotation sensor components (e.g., gyroscope), and so forth. The environmental components 1260 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1262 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1250 can include communication components 1264 operable to couple the machine 1200 to a network 1280 or devices 1270 via a coupling 1282 and a coupling 1272, respectively. For example, the communication components 1264 can include a network interface component or other suitable device to interface with the network 1280. In further examples, the communication components 1264 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 can be another machine or any of a wide variety of peripheral devices (e.g., a peripheral device coupled via a USB).

Moreover, the communication components 1264 can detect identifiers or include components operable to detect identifiers. For example, the communication components 1264 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1264, such as location via Internet Protocol (IP) geolocation, location via Wi-Fi® signal triangulation, location via detecting an NFC beacon signal that can indicate a particular location, and so forth.

In various example implementations, one or more portions of the network 1280 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 can include a wireless or cellular network and the coupling 1282 can be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 can be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 can be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a processing device; and
a memory coupled to the processing device and storing instructions that, when executed by the processing device, cause the system to perform operations comprising:
receiving, within a graphical user interface depicting a representation of a part, a selection of an area of the part;
based on the selection of the area of the part, determining a location of the selected area;
based on the determined location, determining one or more image capture parameters, the image capture parameters including, for each of one or more camera positions, at least a location and angle for a camera, from which said camera position at least one respective image of the determined location of the selected area is to be captured;
based on the determined image capture parameters, computing an inspection path of the camera with respect to the part in accordance with the determined location of the selected area; and
executing the computed inspection path by moving the camera with respect to the part via an inspection system, and capturing the at least one image of the part with the camera using the image capture parameters;
wherein the operations further comprise:
classifying one or more elements within the selected area of the part as belonging to a component type;
determining at least one inspection requirement for the area of the part based on the component type, the inspection requirement being associated with a test of a parameter of elements having the component type; and wherein the one or more image capture parameters are further determined based on the at least one inspection requirement, and the associated test.

2. The system of claim 1, wherein the computed inspection path comprises one or more instructions to acquire said at least one image of the selected area.

3. The system of claim 1, wherein the operations of the system computing the inspection path comprise computing the inspection path to avoid collision between said one or more elements of the inspection system and the part.

4. The system of claim 1, wherein the memory further stores instructions to cause the system to perform operations comprising identifying, within a model of the part, said one or more elements.

5. The system of claim 4, wherein the operations of the system determining one or more image capture parameters comprise determining one or more testing parameters associated with the identified one or more elements.

6. The system of claim 4, wherein the operations of the system determining one or more image capture parameters comprise receiving a selection of one or more testing parameters for association with the identified one or more elements.

7. The system of claim 4, wherein the operations of the system identifying one or more elements comprise identifying a component type included within the part.

8. The system of claim 4, wherein the operations of the system identifying one or more elements comprise identifying a component sub-type included within the part.

9. The system of claim 4, wherein the operations of the system identifying one or more elements comprise:
presenting, within the graphical user interface, one or more images of the part;
receiving, within the graphical user interface, a selection of one or more regions of the one or more images that correspond to the one or more elements; and
associating the one or more selected regions with one or more testing parameters that correspond to the selected elements.

10. The system of claim 9, wherein said presenting comprises presenting as a collection of images that are displayed/superimposed as floating patches in 3D space.

11. The system of claim 1, wherein the memory further stores instructions to cause the system to perform operations comprising:
capturing one or more images of the part during an execution of an inspection path;
presenting the one or more images via a graphical user interface;
receiving a selection with respect to at least one of the one or more captured images; and
based on the selection of at least one of the one or more captured images, generating an inspection plan with respect to the part.

12. The system of claim 11, wherein capturing one or more images comprises loading one or more previously captured images of the part.

13. The system of claim 11, wherein receiving a selection with respect to at least one of the one or more captured images comprises receiving a selection that accepts or rejects at least one of the one or more captured images.

14. The system of claim 11, wherein generating an inspection plan comprises generating an inspection plan with respect to the part based on (a) the computed inspection path and (b) the one or more image capture parameters.

15. The system of claim 11, wherein generating an inspection plan comprises adjusting an inspection plan to account for one or more limitations of the inspection system or a likelihood of high-quality image generation.

16. The system of claim 11, wherein generating an inspection plan comprises associating one or more testing parameters with at least one of the one or more images.

17. The system of claim 11, wherein generating an inspection plan comprises associating one or more first testing parameters with a first one of the one or more images and one or more second testing parameters with a second one of the one or more images.

18. The system of claim 11, wherein the memory further stores instructions to cause the system to perform operations comprising executing the generated inspection plan with respect to the part.

19. The system of claim 11, wherein the memory further stores instructions to cause the system to perform operations comprising executing the generated inspection plan with respect to another part.

20. The system of claim 1, wherein the memory further stores instructions to cause the system to perform operations comprising:
identifying a model reflecting a representation of the part;
based on the model, computing one or more dimensions of the part;
capturing one or more images of the part;
associating the one or more captured images with the computed dimensions; and
validating the computed dimensions based on the association of the one or more captured images.

21. The system of claim 20, wherein identifying a model comprises identifying a CAD model of the part.

22. The system of claim 1, wherein the memory further stores instructions to cause the system to perform operations comprising:
receiving one or more inputs that correspond to one or more aspects of the part, using said graphical user interface;
capturing one or more images of the part;
associating the one or more captured images with the one or more aspects; and
validating the received one or more aspects based on the association of the one or more captured images.

23. The system of claim 22, wherein receiving one or more inputs comprises receiving a selection of a CAD model of the part, one or more inputs corresponding to one or more dimensions or shape of the part, or one or more inputs corresponding to a template that reflects one or more dimensions of the part.

24. The system of claim 22, wherein associating the one or more captured images comprises presenting, via a graphical user interface, at least one of the one or more captured images in relation to a representation of the one or more aspects of the part.

25. The system of claim 24, wherein said presenting comprises presenting images associated or augmented with visual indicators or masks.

26. The system of claim 22, wherein validating the one or more aspects comprises receiving one or more user inputs corresponding to the association of the one or more captured images with the one or more aspects of the part, wherein the one or more user inputs reflect whether the one or more aspects are accurate with respect to the part as depicted in the one or more images.

27. The system of claim 1, wherein the memory further stores instructions to cause the system to perform operations comprising:
   receiving one or more inputs that correspond to one or more dimensions of the part;
   capturing one or more images of the part;
   associating the one or more captured images with the one or more dimensions; and
   validating the received dimensions based on the association of the one or more captured images.

28. The system of claim 1, wherein the memory further stores instructions to cause the system to perform operations comprising:
   identifying a model reflecting a representation of a fixture configured to support the part within the inspection system;
   based on the model, computing one or more dimensions of the fixture;
   capturing one or more images of the fixture;
   associating the one or more captured images of the fixture with the computed dimensions of the fixture;
   validating the computed dimensions of the fixture based on the association of the one or more captured images; and
   using said validated dimensions for computing an inspection plan.

29. The system of claim 1, wherein the memory further stores instructions to cause the system to generate an instruction to move a robotic imager, from instructions received using said graphical user interface and acquire images and wherein said computing an inspection path is also based on said generated instruction.

30. A method comprising:
   receiving, within a graphical user interface depicting a representation of a part, a selection of an area of the part;
   based on the selection of the area of the part, determining a location of the selected area;
   based on the determined location, determining one or more image capture parameters, the image capture parameters including, for each of one or more camera positions, at least a location and angle for a camera, from which said camera position one or more respective images of the determined location of the selected area are to be captured;
   based on the determined image capture parameters, computing an inspection path of the camera with respect to the part in accordance with the determined location of the selected area;
   capturing the one or more images of the part during an execution of the inspection path;
   presenting the one or more captured images via a graphical user interface;
   receiving a selection with respect to at least one of the one or more captured images;
   based on the selection, associating one or more testing parameters with at least one of the one or more captured images; and
   based on the associated one or more testing parameters, generating an inspection plan with respect to the part;
   classifying one or more elements within the selected area of the part as belonging to a component type; and
   determining at least one inspection requirement for the area of the part based on the component type, the inspection requirement being associated with a test of a parameter of elements having the component type;
   wherein the one or more image capture parameters are further determined based on the at least one inspection requirement, and the associated test.

* * * * *